3,142,557
METHOD OF CONVERTING WASTE MATERIAL
INTO FERTILIZER
Marshall MacDuffie, New York, and Stephen Varro, Jr., Rego Park, N.Y., assignors to Waste Processes, Inc., New Haven, Conn., a corporation of Delaware
Filed Nov. 24, 1959, Ser. No. 855,223
8 Claims. (Cl. 71—9)

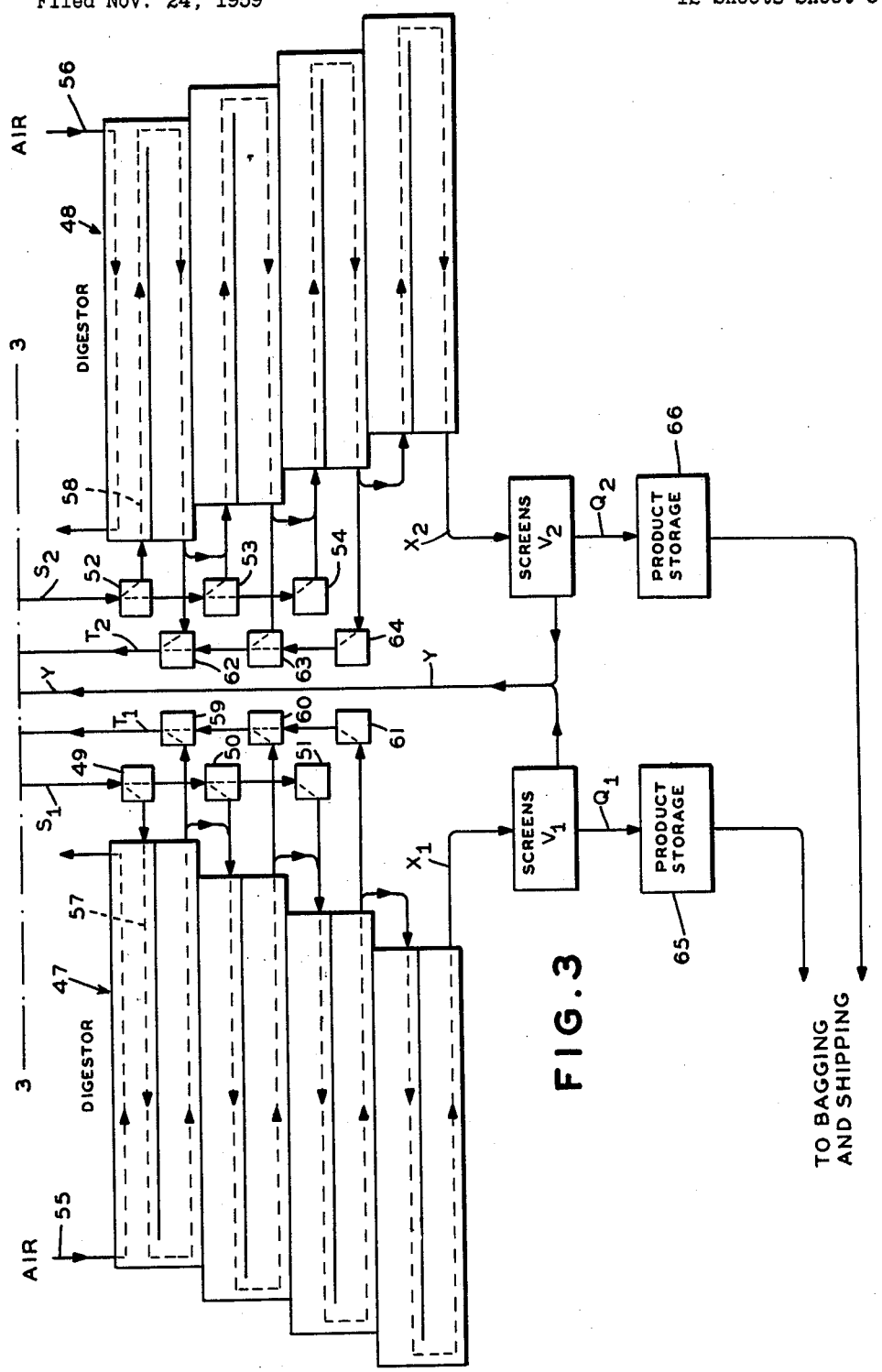

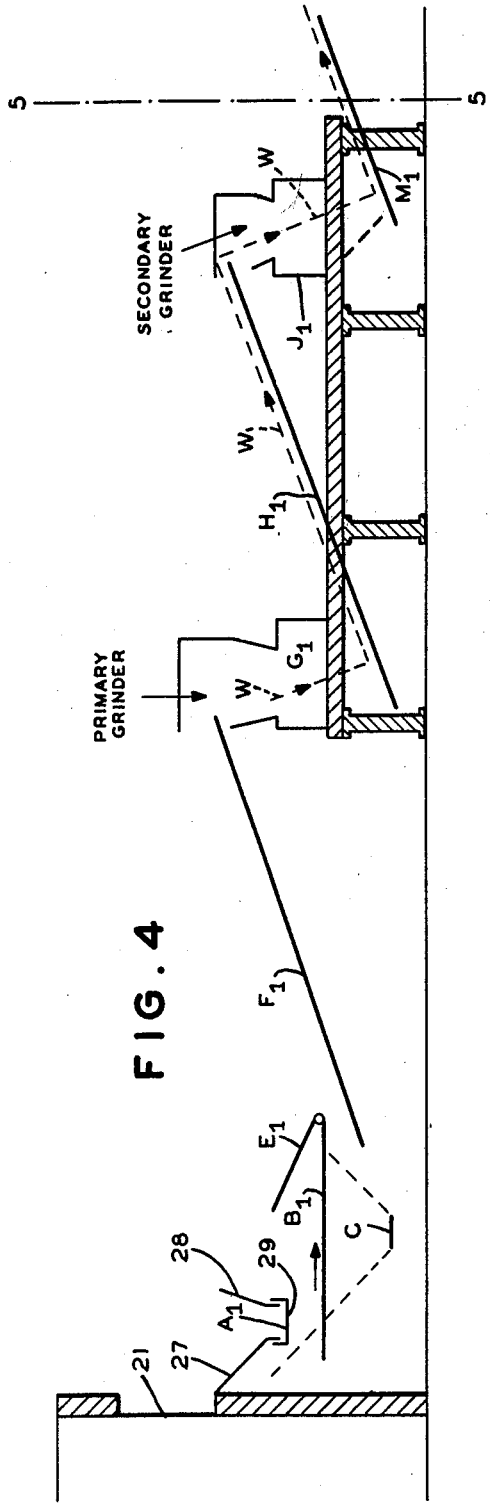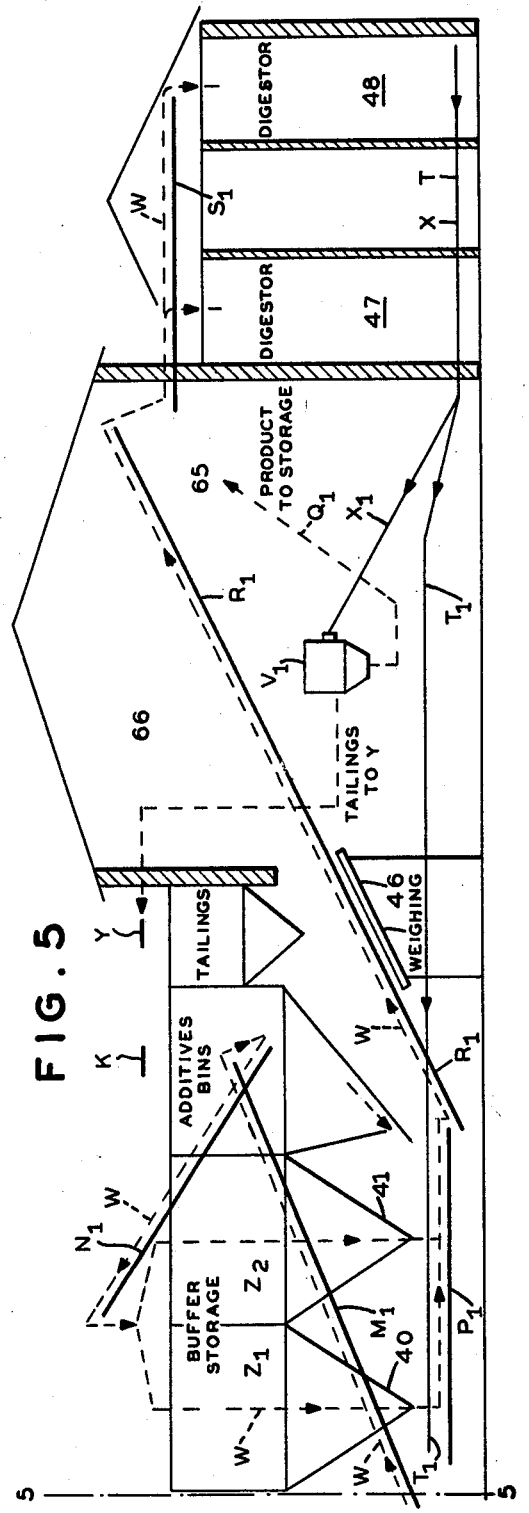

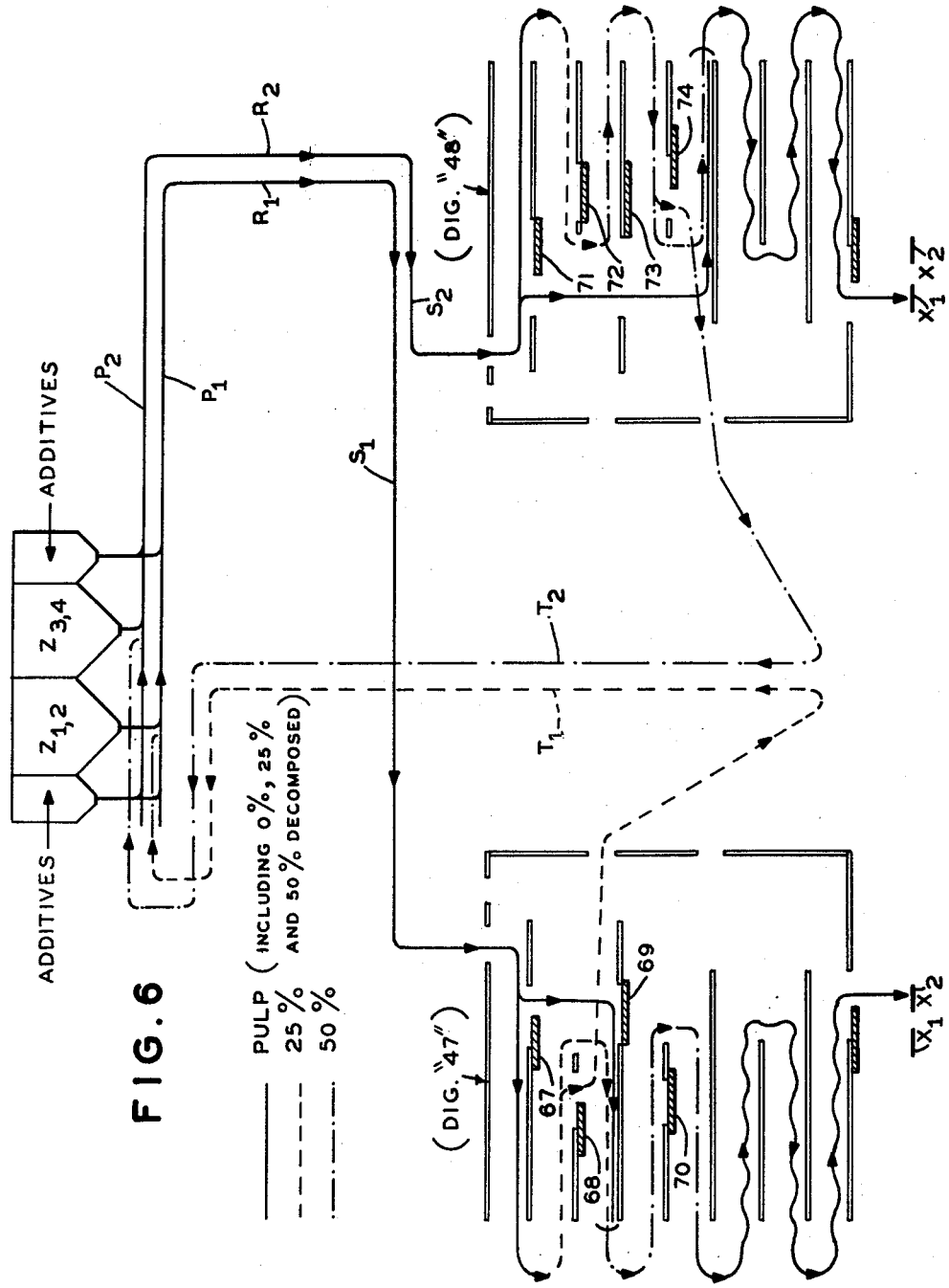

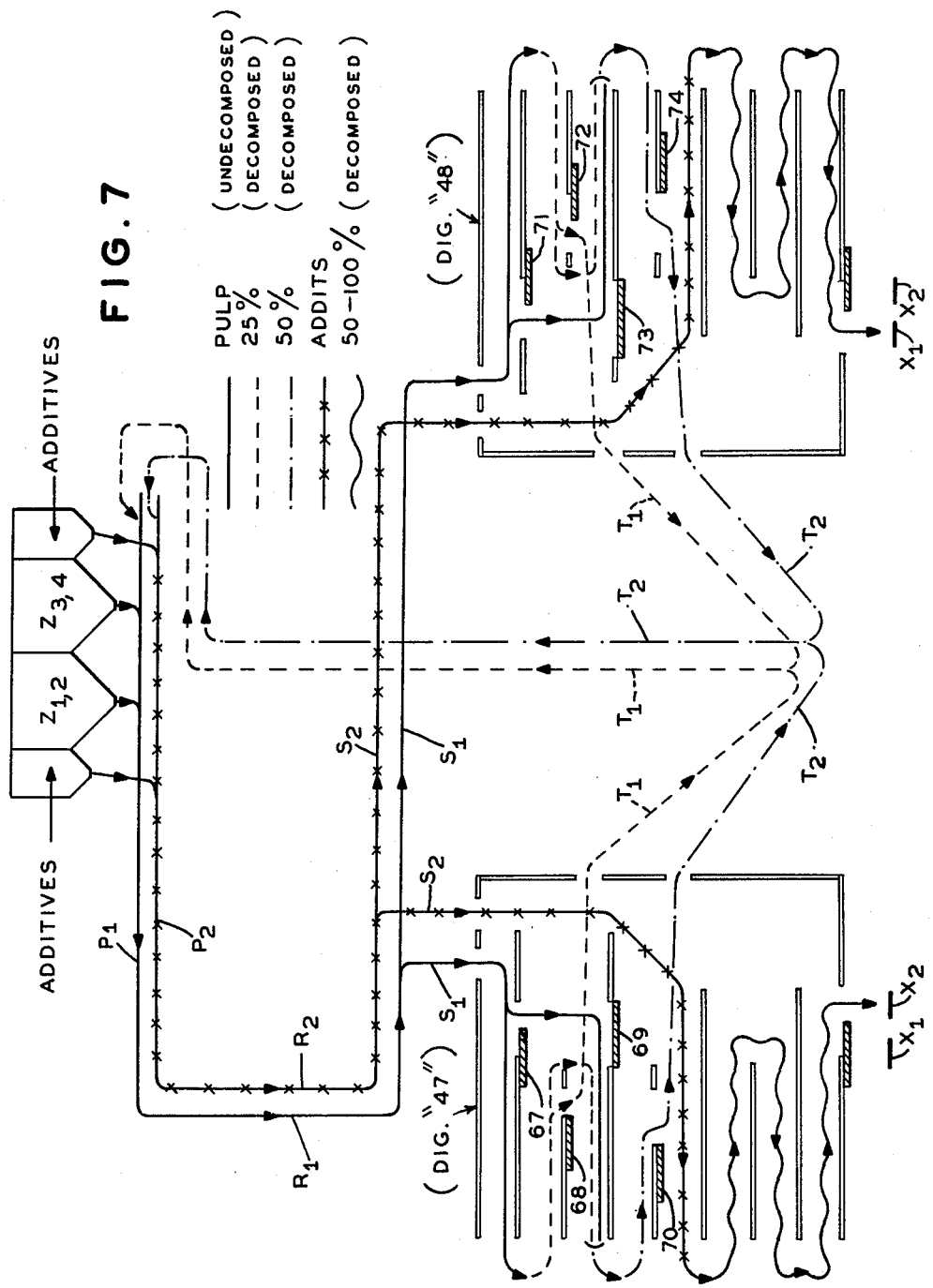

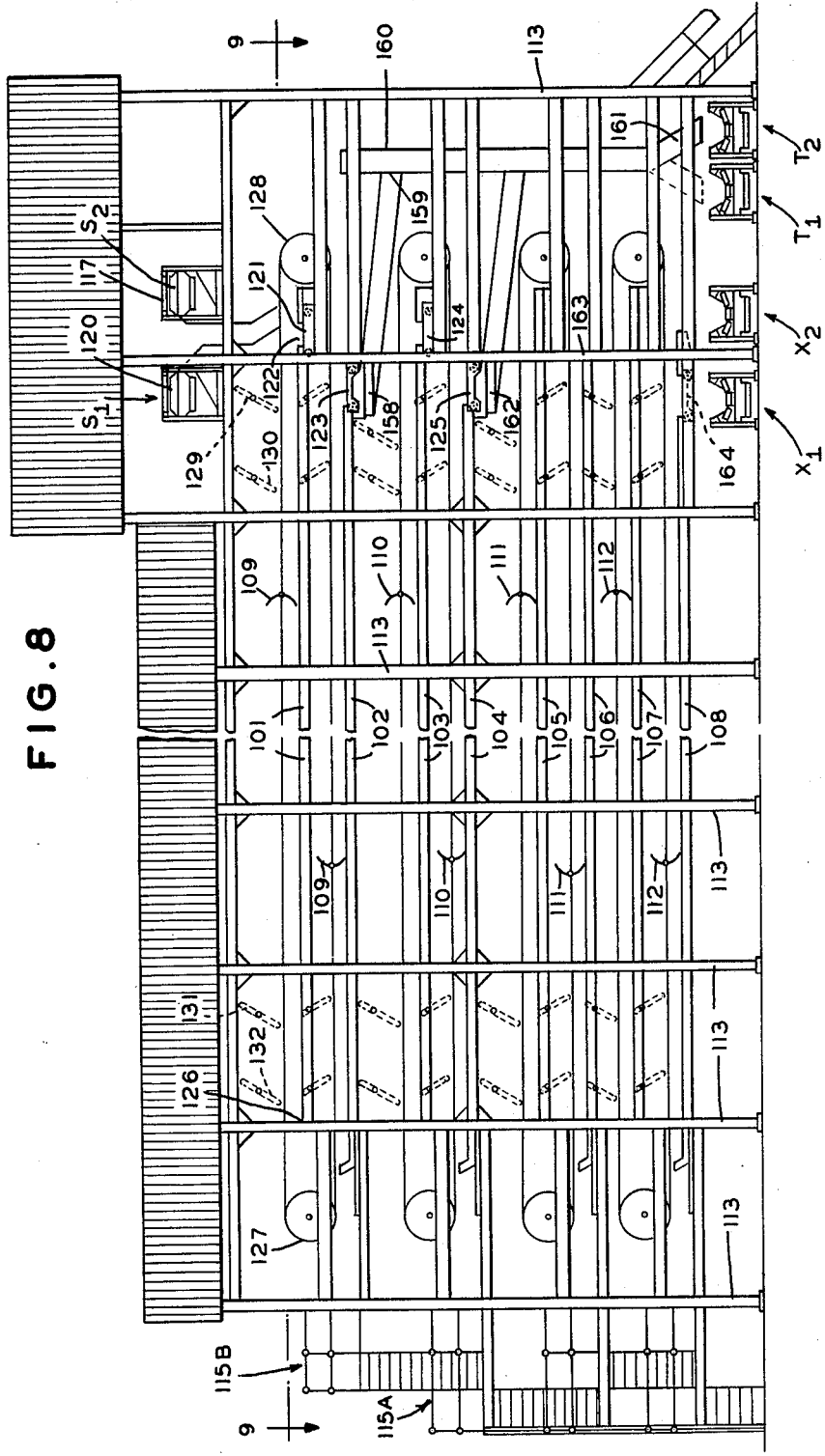

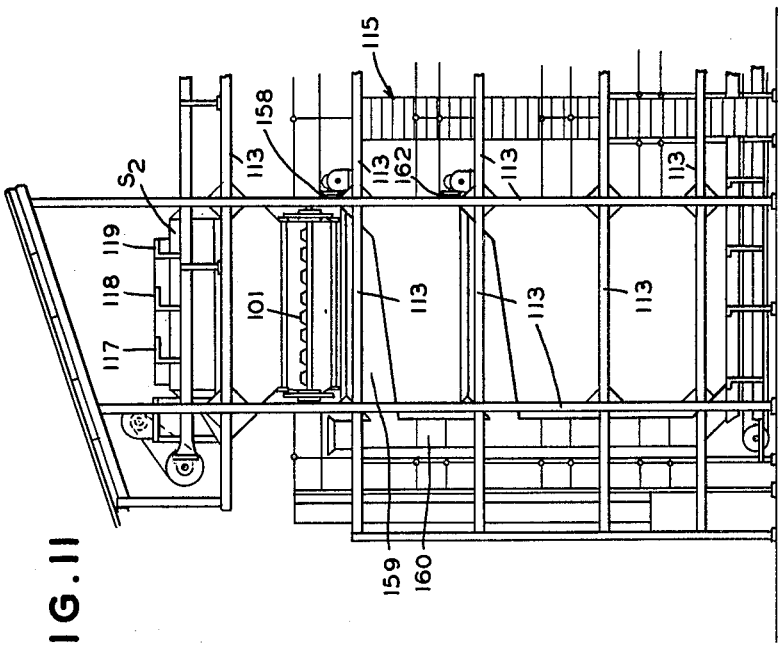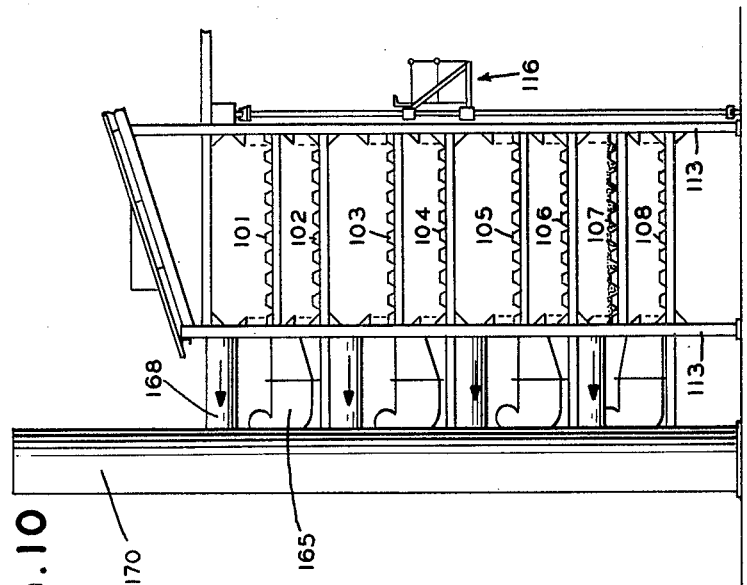

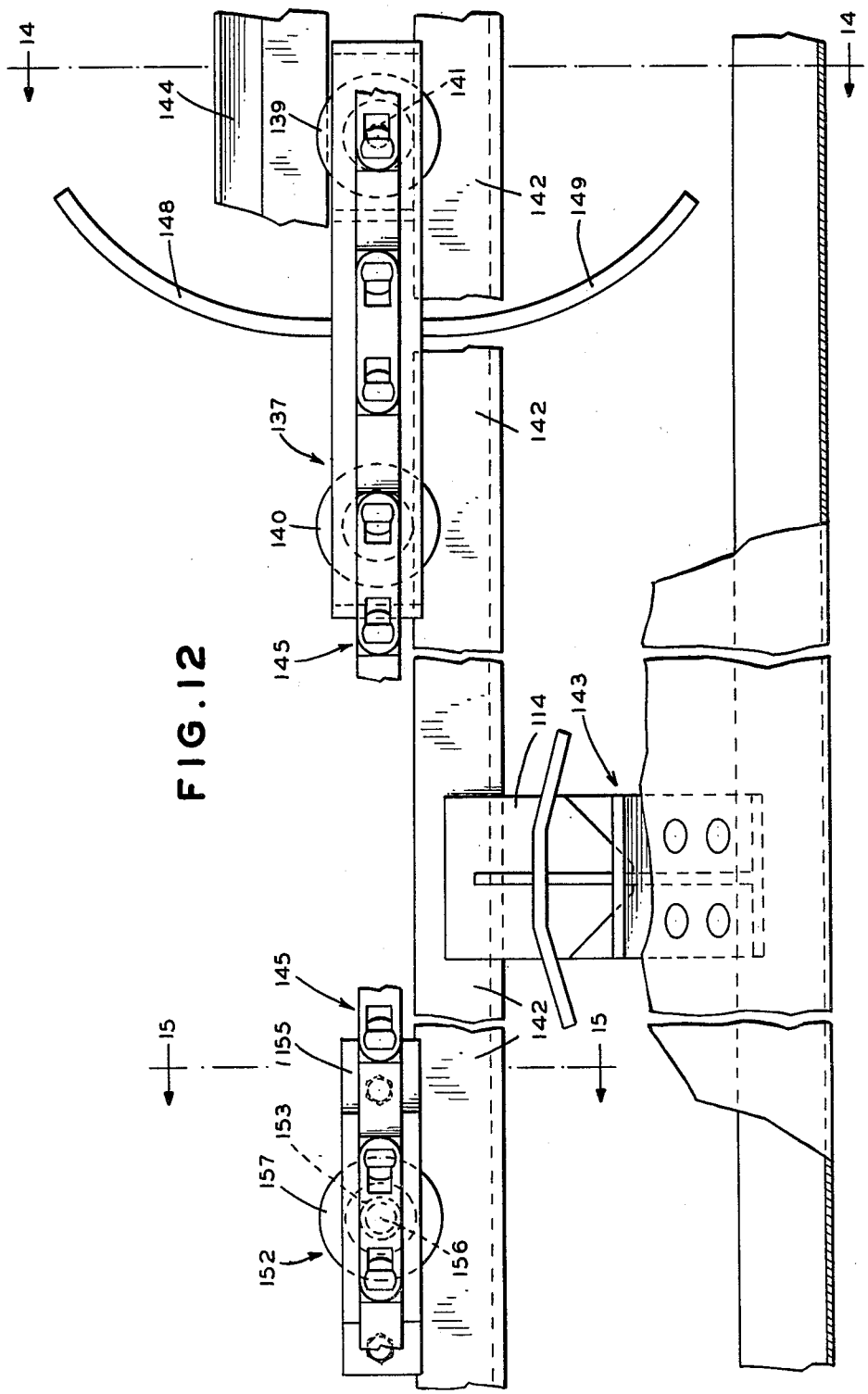

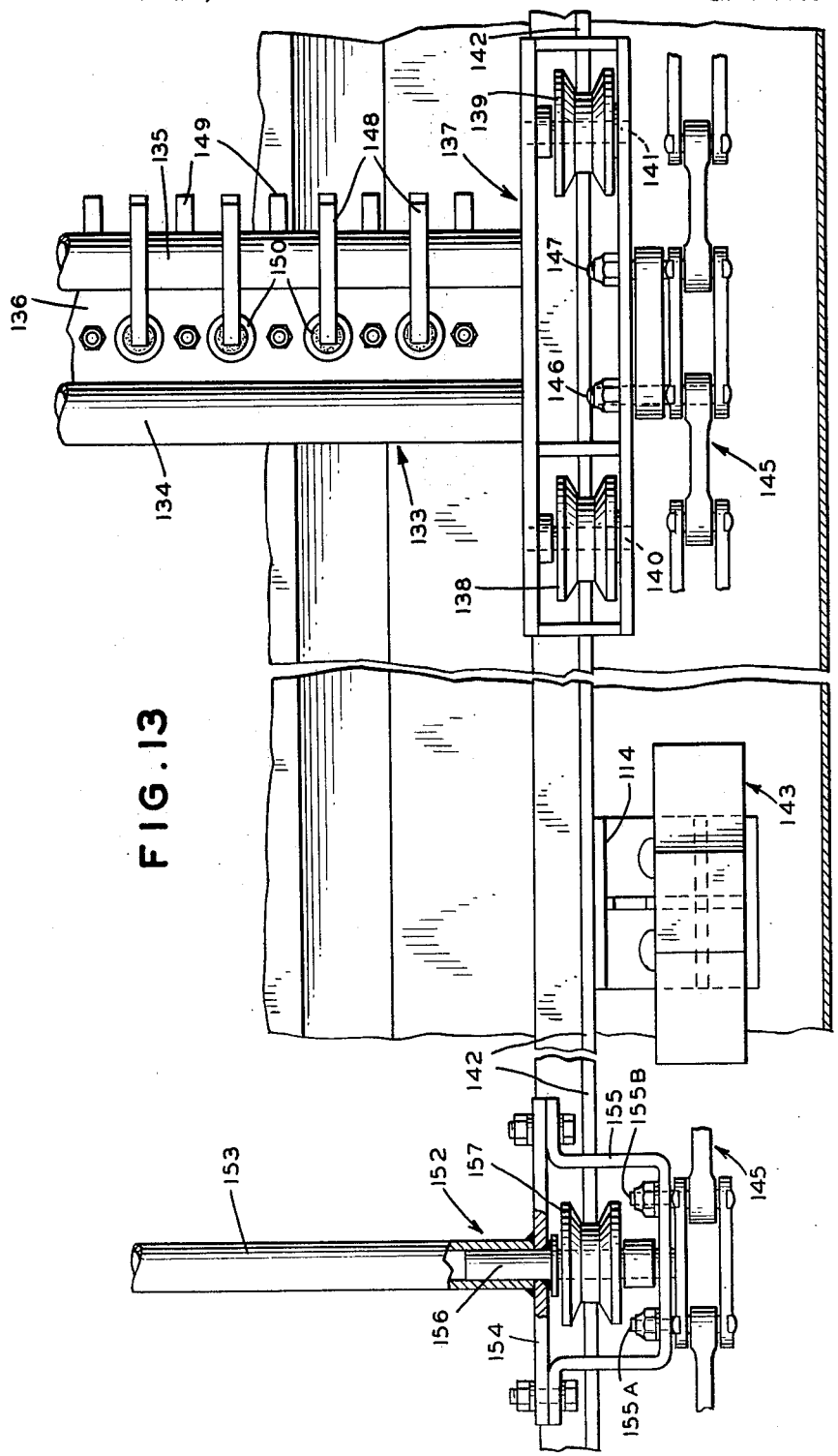

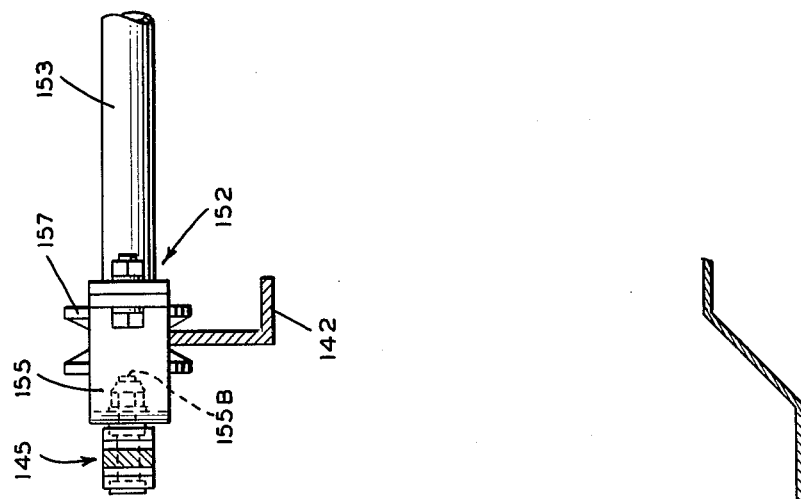
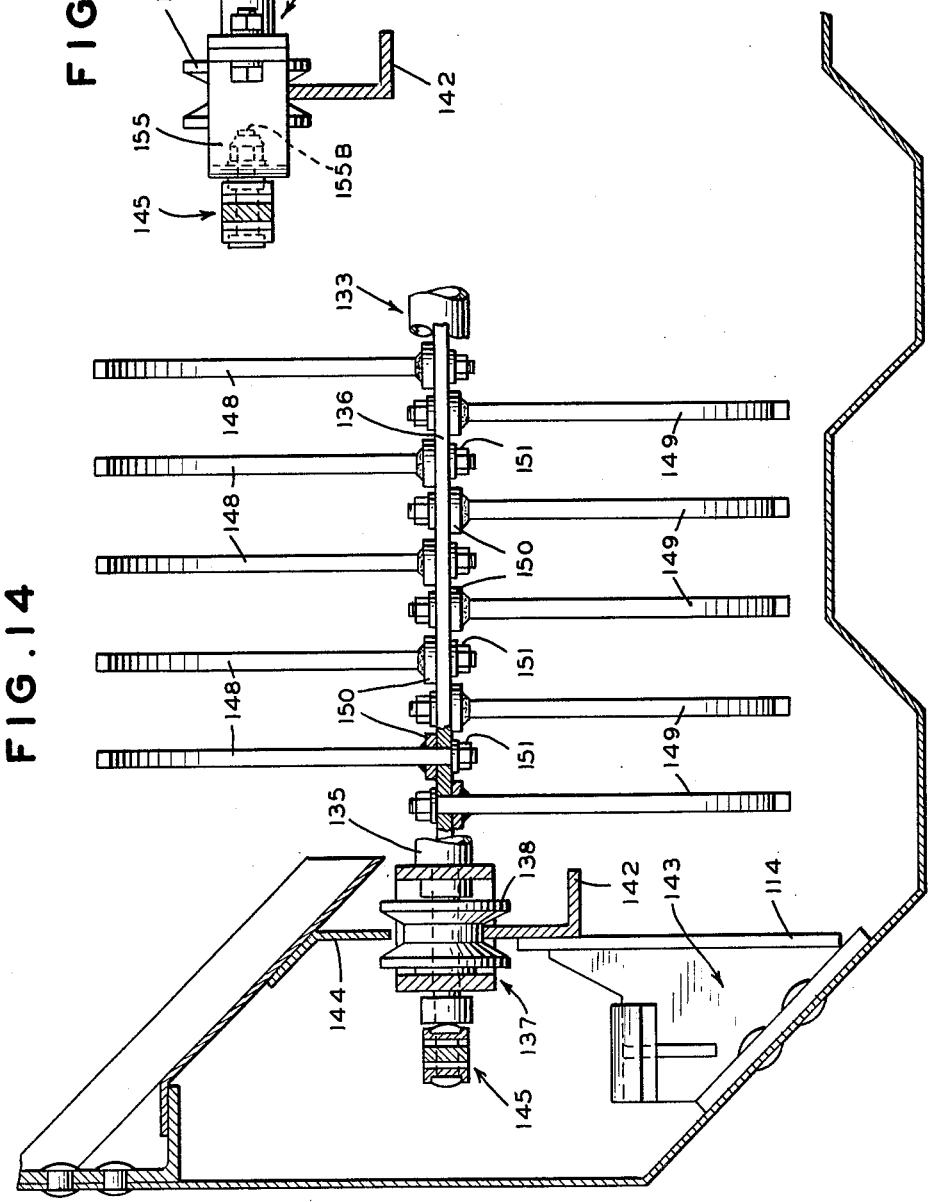

The present invention relates to waste conversion and more particularly to a method and apparatus for producing organic fertilizer from organic waste materials.

It has long been recognized that it would be economically desirable to convert waste materials into organic fertilizers, and various systems and apparatus for this purpose have been suggested. However, these systems and apparatus have been subject to various deficiencies which have prevented their use in efficient commercial waste conversion operations. These deficiencies, certain of which will be discussed below, are eliminated or substantially reduced by the practice of the present invention.

The waste materials with which the present invention is concerned are generally those organic wastes which are susceptible of decomposition under aerobic bacterial action. Among these waste materials are: (1) urban wastes, e.g., municipal garbage and trash; (2) alimentary wastes, e.g., restaurant refuse, swill, etc.; (3) agricultural wastes, e.g., manure, tobacco stems, bagasse, etc.; and (4) industrial wastes, e.g., canning wastes, coffee grounds, paper wastes, etc. For convenience, the invention will be described primarily in connection with the conversion of urban wastes and especially urban wastes of the type commonly found in municipal refuse, but it should be understood that the invention is also applicable to the conversion of other types of waste.

A principal object of the invention has been the provision of a novel and improved method for producing organic fertilizer from organic waste materials.

Another principal object of the invention has been the provision of novel and improved apparatus for use in the method of the invention.

More particularly, it has been an object of the invention to provide a novel and improved method and apparatus for the controlled continuous flow conversion of waste materials and in which operational flexibility is afforded to permit attainment of a uniform product of predetermined characteristics.

Another important object of the invention has been the provision of a speedy and efficient method and apparatus for converting organic waste materials into organic fertilizer.

One of the difficulties encountered in prior art waste conversion processes has been the objectionable character of the waste material itself, much of which is or tends to become putrid and the processes as suggested have generally not minimized the problem presented by the characteristics of the waste material. An object of the invention has been to provide a sanitary waste conversion method in which the received waste material is promptly converted into a non-objectionable and easy to handle industrial raw material with a minimum of manual handling prior to conversion. A feature of the invention has been the elimination of the conventional waste handling process of agglomerating the waste material at the receiving point.

Another feature of the invention has been to provide for comminution of the received waste material in a substantially uniform fashion and at a substantially uniform rate dependent upon the rate of receipt of the raw material and not upon the rate of subsequent digestion.

Still another object of the invention has been the provision of a waste conversion method in which the raw material can be received over a short interval of time, e.g., the few hours in which dumping of municipal refuse usually occurs, but in which the digestion of the comminuted raw material can be spread evenly over a substantially longer period of time.

A further object of the invention has been the provision of a method and apparatus for waste conversion in which fully controlled addition of process and product additives to the comminuted waste material can conveniently be achieved so as to obtain an end product of practically any desired formula.

Still another object of the invention has been the provision of a waste conversion process and apparatus in which substantial reduction of the hitherto required digestive period through controllable recycling of partially digested waste materials can be achieved. A feature of the invention has been the provision of a process and apparatus in which such recycling can be combined with further controlled addition of process and product additives.

Another object of the invention has been the provision of a novel and improved apparatus for effecting rapid, efficient and controllable aerobic digestion of waste materials.

A further object of the invention has been the provision of apparatus of the above type which is especially adapted for use in a controlled continuous flow conversion process.

A digestor for use in a continuous flow process presents certain mechanical problems. Thus, a relatively slow movement of the mass of material is required to permit intimate and relatively prolonged contact between the material and the air. On the other hand, a relatively large volume of material must be handled in a limited time to achieve a commercially feasible operation. Various digestor designs have been suggested in the prior art, but these have not afforded satisfactory solutions to the twin problems of prolonged intimate air contact and large volume handling. Moreover, the designs of the prior art have not provided the flexibility in handling characteristics requisite for achieving product uniformity on a commercially operable scale.

It has been a further object of the invention to provide a digestor for use in a continuous flow waste conversion system which affords a satisfactory solution to the foregoing problems.

A feature of the invention has been the provision of a digestor of the above type in which the waste material is supported on stationary surfaces and in which agitation and linear travel of the waste material is effected through the use of linearly moving plow elements.

Another feature of the invention has been the provision of a digestor of the above type which affords numerous and flexibly usable feed and discharge points at various spaced stages in the discharge process.

A further object of the invention has been to provide a digestor of the above type in combination with recirculation and feed means to provide a substantial reduction in digestion time, i.e., the time required for decomposition, by permitting the use of higher layers of pulp without reducing the speed of pulp movement.

Most of the states have laws intended to control the sale of materials as fertilizers, and many of these laws prohibit the sale of material as a fertilizer if it does not contain specified minimum contents of nitrogen, phosphorus and potassium. Generally, material prepared by a composting operation fails to meet these minimum standards for fertilizer. An important object of the invention has been the provision of a novel and improved apparatus and process by which addition of required enrichment agents to produce salable fertilizer is effected during and as a part of the composing operation rather than as a final and separate step after composting is complete.

Yet another feature of the invention has been the provision of a novel and improved digestion process and apparatus in which product additives required for enrichment purposes can conveniently be supplied in the form of waste materials, e.g., activated sludge for nitrogen content and ground tobacco stems for potash content.

Other and further objects, features and advantages of the invention will appear more fully from the following description.

The invention will now be described in greater detail with reference to the appended drawings, in which:

FIGS. 1, 2 and 3, when joined along the lines 2—2 and 3—3, form a flow sheet illustrating the steps involved in carrying out one embodiment of the method of the invention;

FIGS. 4 and 5, when joined along the lines 5—5, form a schematic diagram (taken as if on a longitudinal cross section of a plant) illustrating the relative elevations and dispositions of various elements shown in the flow sheet of FIGS. 1, 2 and 3;

FIG. 6 is a simplified flow sheet illustrating one example of a recirculation arrangement;

FIG. 7 is a simplified flow sheet illustrating another example of a recirculation arrangement;

FIG. 8 is a side elevational view, partly schematic, of a digestor constructed in accordance with the invention, but with siding removed to illustrate constructional details;

FIG. 10 is a sectional view taken along the line 10—10 of FIG. 9;

FIG. 11 is an end elevational view taken from the right end of the digestor as shown in FIG. 10;

FIG. 12 is a partial side elevational view of a digestor conveyor chain and rake construction for use in the digestor of FIGS. 8–11;

FIG. 13 is a partial plan view corresponding to FIG. 12;

FIG. 14 is an enlarged partial sectional view taken along the line 14—14 of FIG. 12; and FIG. 15 is an enlarged partial sectional view taken along the line 15—15 of FIG. 12.

Figure 1:
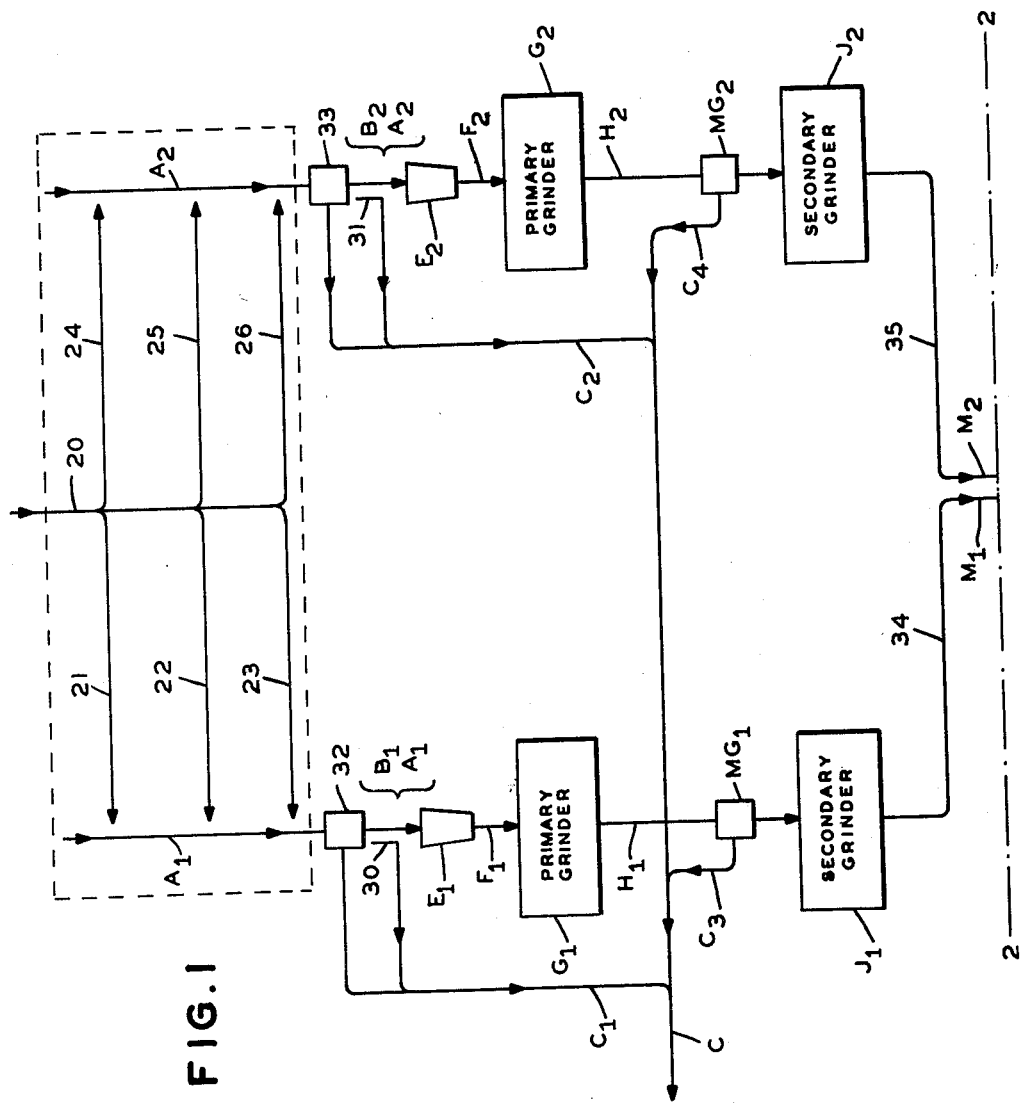
Figure 2:
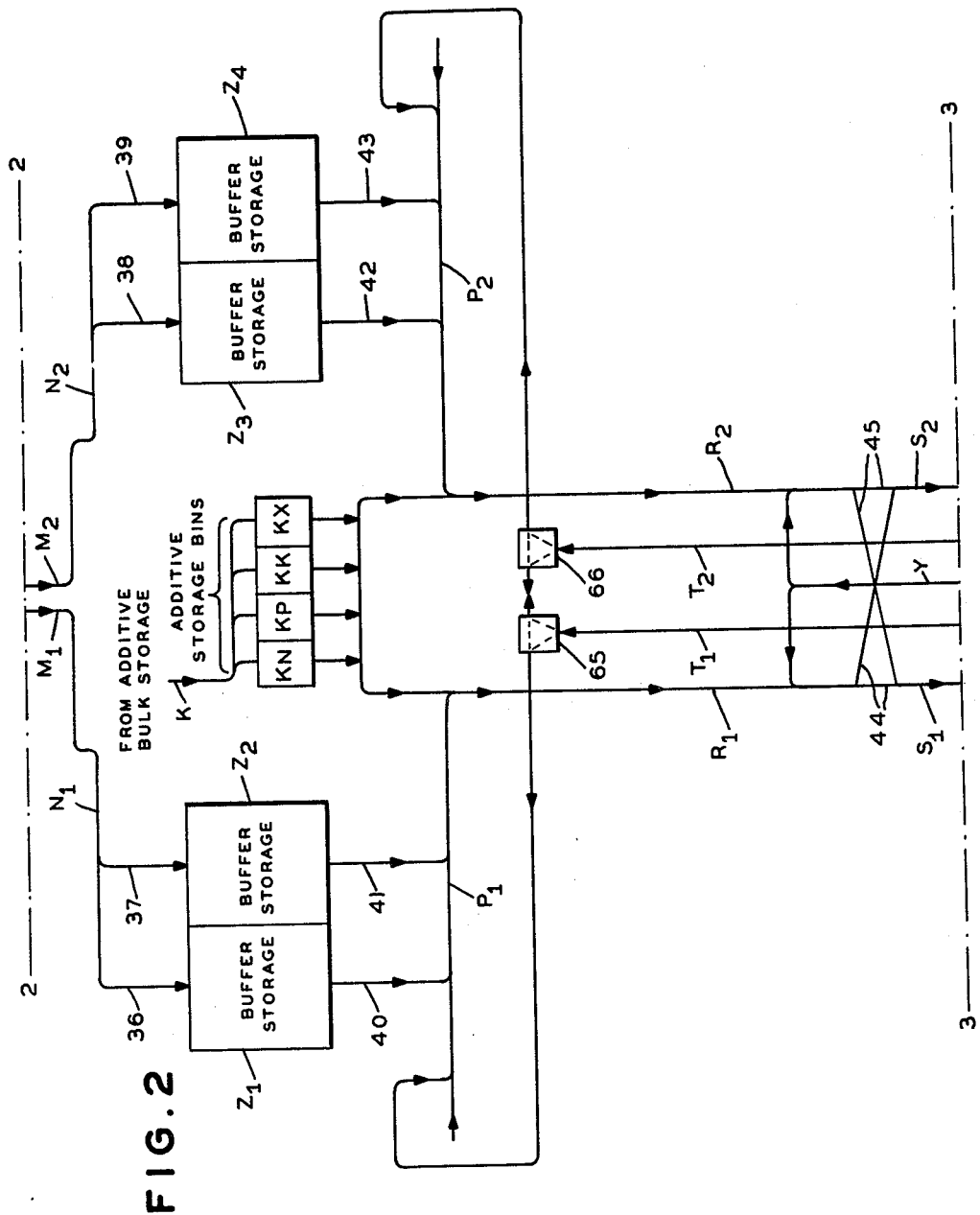

Referring now to the drawings, and more particularly to FIGS. 1, 2 and 3, there is shown a flow sheet for one embodiment of a waste conversion plant in accordance with the invention.

Trucks carrying garbage or other refuse enter a truck platform indicated by the line 20 and back up to unloading doors indicated by the arrows 21–26. One of the unloading doors, designated 21, is shown in FIG. 4. The unloading doors 21, 22 and 23 are disposed adjacent and above a trough $A_1$ while the doors 24, 25 and 26 are similarly disposed with respect to a trough $A_2$. Assuming a truck unloading time of fifteen minutes, each of the six doors would provide unloading facilities for four trucks per hour, or a total capacity of 24 trucks per hour. Assuming a truck load to average four tons, the six doors could handle 96 tons per hour or approximately 300 tons in a period of three hours. The foregoing numerical example and others set forth hereinafter, including dimensions, elevations, capacities and other design features, are given solely by way of illustration and should not be considered as in any sense limitations of the invention. For convenience, the plant described may be considered as a 300 ton per day plant, but this would represent a relatively small-sized plant.

Each of the troughs $A_1$ and $A_2$ is provided with a front sloping side 27 (FIG. 4), a rear side 28 and a movable bottom 29. The movable bottom 29 is preferably in the form of an apron conveyor. The apron conveyors should be able to withstand the force exerted by refuse dumped thereon from the maximum dump truck elevation plus the difference in elevation between the truck-supporting floor and the trough bottom, which total might be about 20 feet. The apron conveyors move continuously in the direction shown by the arrows and at a rate which may be adjusted to prevent the formation of unduly high piles of refuse on the conveyors. In general, the refuse should be moved along the troughs $A_1$ and $A_2$ at a rate at least as fast as the rate of discharge of the refuse fed into the troughs from the trucks.

The apron conveyors of the troughs $A_1$ and $A_2$ are discharged onto conveyor belts $B_1$ and $B_2$, respectively, as by means of plows disposed diagonally in the path of advance of the refuse on the apron conveyors. In this case the conveyor belts $B_1$ and $B_2$ are disposed beneath and travel at right angles with respect to the troughs $A_1$ and $A_2$, respectively, and therefore the drop from the A conveyors to the B conveyors should be sufficient to minimize heaps of refuse which may have formed on the apron conveyors. This drop might be four feet. The refuse is thus spread out with fair uniformity over the belts $B_1$ and $B_2$. The refuse is further evened out into a uniform mat by compressors $E_1$ and $E_2$ provided at the discharge ends of the belts $B_1$ and $B_2$, respectively. These compressors may be in the form of downwardly and forwardly inclined inverted apron conveyors or plates disposed above the discharge ends of the B belts and having their forward ends disposed above the belts by a distance adjustable to the maximum desired height of refuse. The compressors thus act as scrapers which tend to even out the refuse height and also to compact the refuse. If desired, the belts $B_1$ and $B_2$ may be dispensed with and the refuse on the $A_1$ an $A_2$ conveyors may be leveled out, as by passing under circulating chain feeders, and deposited on the belt conveyors $F_1$ and $F_2$. In such case the compressors $E_1$ and $E_2$ should be provided adjacent the discharge ends of the $A_1$ and $A_2$ conveyors, respectively.

The compacted or matted material drops off the ends of the belts $B_1$ and $B_2$ or of apron conveyors $A_1$ and $A_2$ onto conveyor belts $F_1$ and $F_2$, respectively. The belts $F_1$ and $F_2$ are inclined upwardly as shown in FIG. 4 and carry the uniformly matted refuse to the feed points of primary grinders $G_1$ and $G_2$, respectively.

The portion of the plant comprising the area from the points where the refuse is dumped from the trucks to the points where it enters the primary grinders may be termed the "open refuse" portion. The physical extent of this portion of the plant should be as small as possible to minimize objectionable nuisances and is preferably isolated from the remainder of the plant. The grinders $G_1$ and $G_2$, which may be of any convenient type adapted to grind the raw refuse to the desired fineness, change the raw refuse into a finely ground pulp. The pulp discharged from the grinders $G_1$ and $G_2$ is no longer refuse or garbage but rather an industrially manageable and nuisance-free raw material.

Walkways and working platforms are provided along the belts $B_1$ and $B_2$, as indicated by the reference numerals 30 and 31, and adjacent the apron conveyors $A_1$ and $A_2$, as indicated by the reference numerals 32 and 33. These walkways and working platforms are provided to facilitate segregation from the incoming raw refuse of such alien matter as would be apt to damage the grinders. In general, grinders of the type commercially available cannot handle sizeable pieces of building materials, pieces of steel or iron beams, hunks of concrete or other similar large hard articles which, because of their mechanical size and qualities, are apt to damage the grinders. Smaller pieces of such inorganic matter may pass through the grinders and, except for extremely small pieces, will be removed in a subsequent screening.

Workmen stationed on the walkways and working platforms inspect the passing refuse and remove the objectionable pieces of alien matter and drop such pieces through conveniently arranged chutes (here indicated by $C_1$ and $C_2$) onto a discharge conveyor or cart C.

The outputs of grinders $G_1$ and $G_2$ are discharged downwardly onto moving conveyor belts $H_1$ and $H_2$, respectively. Belts $H_1$ and $H_2$ are inclined upwardly (FIG. 4) and carry the ground pulp to a point above respective hoppers of secondary grinders $J_1$ and $J_2$, which serve to further grind the pulp. As shown in FIG. 1 (but not in FIG. 4), the pulp discharged from conveyors $H_1$ and $H_2$ may be passed through screens and/or magnetic separators to remove pieces of metal, etc., not removed in the previous inspection. The screens and/or separators are indicated at $MG_1$ and $MG_2$, and the screened or separated pieces may be discharged on chutes, for example, the chutes $C_3$ and $C_4$ shown joining $MG_1$ and $MG_2$ with conveyor or cart C.

The grinding capacity of the primary and secondary grinders should be selected so that refuse can be ground at the maximum rate received from the trucks so that there will not be delays which will cause a pile up of refuse in advance of the grinders. Similarly, the sizes and speeds of the belts $F_1$ and $F_2$ feeding the primary grinders and of the belts $H_1$ and $H_2$ feeding the secondary grinders should be selected to meet the feeding requirements of the grinders.

In general, the width of conveyors in the open refuse section and between the primary and secondary grinders should be greater than is required for subsequent conveyors because of the necessity for handling some more or less bulky material.

The primary and secondary grinders should be selected to provide a pulp ground sufficiently fine that adequate surface area is afforded for rapid decomposition but not so fine that organic and bacterial alteration is likely or that undue packing or loss of moisture will occur. In general, good operation requires a secondary grinder output lying in the range of about 4–12 mesh, that is to say, the minimum size of ground particles should not be smaller than to be just passed by a 12 mesh screen, while the maximum size of ground particles should not be greater than to be just held on a 4 mesh screen.

The outputs of secondary grinders $J_1$ and $J_2$ are discharged downwardly through chutes 34 and 35, respectively, onto upwardly inclined moving conveyor belts $M_1$ and $M_2$. The pulp is discharged from the end of belts $M_1$ and $M_2$ onto further upwardly inclined conveyor belts $N_1$ and $N_2$. The belts $N_1$ and $N_2$ carry the pulp toward a point centrally disposed above buffer storage tanks $Z_1$, $Z_2$, $Z_3$ and $Z_4$, discharging the pulp into preselected ones of buffer storage tanks $Z_1$, $Z_2$, $Z_3$ or $Z_4$, as by means of a revolving circular hopper. Preferably, chutes are provided to guide the pulp into the respective buffer storage tanks, as indicated at 36, 37, 38 and 39.

The buffer storage tanks are required because the rate and volume at which pulp should be fed to the digestors is determined by entirely different factors from those that determine the rate and volume of pulp discharge from the secondary grinders. The latter is a function of the rate and volume of refuse discharged from the trucks, and the entire delivery period will be a matter of hours. The former is a function of the speed of digestion and also of the requirement for fresh pulp feed for digestion. The speed of digestion will be of the order of one to three days, preferably about one day. The requirement for fresh pulp delivery from the buffer storage to the digestors will be dependent on the speed of digestion and also on the extent of recirculation of partially digested pulp, as varied from time to time.

The total capacity of the buffer storage tanks should be at least equal to the daily refuse handling capacity of the plant. For example, for a 300 ton per day plant and assuming a maximum specific weight of refuse of 50 pounds per cubic foot, a minimum buffer storage capacity of 12,000 cubic feet would be required. Assuming a maximum specific weight of refuse of 30 pounds per cubic foot, a buffer storage capacity of 20,000 cubic feet would be required. The required capacity may be divided into as many buffer storage tanks as desired.

Each of the buffer storage tanks is provided with a controllable discharge hopper or "dosifier" to permit controlled discharge from the tanks $Z_1$ and $Z_2$ onto a conveyor belt $P_1$ and from the tanks $Z_3$ and $Z_4$ onto a conveyor belt $P_2$, as shown at 40, 41, 42 and 43. If desired, the dosifiers may be made movable, as on rails, so that each can service more than one buffer storage tank. Thus, one dosifier may be provided to service all of the buffer storage tanks feeding one of the P belts. For example, one dosifier 40 may service tanks $Z_1$ and $Z_2$, while another dosifier 42 may service tanks $Z_3$ and $Z_4$.

Where the received refuse is more or less homogeneous within desired limits, it may be distributed as desired among the various buffer storage tanks. But where substantial differences in texture or content exist from one time to another, pulp from refuse of different characters may, if desired, be fed to different buffer storage tanks for controlled feeding to the digestors. This arrangement facilitates subsequent control of feed of process and product additives and recycling so as to achieve a homogeneous end product. For example, it may be desirable to treat restaurant swill differently from ordinary household garbage, and this treatment will be facilitated if the operators control the belts $N_1$ and $N_2$ and the chutes 36–39 so that pulp from restaurant swill is fed into a particular buffer storage tank or tanks.

Since the moisture content and other characteristics of incoming refuse may differ from time to time, feed of the pulp to the buffer storage tanks may be controlled to provide more or less equalization of stored pulp characteristics within the tanks or to ensure that pulp from refuse with particular characteristics is stored in a particular tank or tanks different from the tank or tanks in which pulp from refuse with other characteristics is stored. To facilitate distribution of the ground refuse, suitable instruments may be provided to indicate the moisture content and other characteristics of pulp on the belts $M_1$ and $M_2$ or at other suitable points in the process. Visual observation of the advancing whole or ground refuse will also provide information to permit suitable routing of the ground pulp and suitable subsequent feed of process additives.

To ensure proper moisture content in the pulp delivered to the digestors and to avoid undue packing of pulp in the buffer storage tanks and seepage of moisture toward the bottom part of the tank if the pulp is stored motionless for periods beyond a few hours, the buffer storage tanks are preferably provided with conical double bottoms, the inner walls of which contain numerous perforations through which moisture can drain into the double bottom and through which moisture can be driven into the pulp mass. For this purpose, air pressure or steam can be used to loosen up the pulp mass if it tends to settle unduly in the tank and, if desired, also to force the moisture into and throughout the pulp within the buffer storage tank. In this way a desired and homogeneous moisture content of the pulp can be assured even though the pulp may be stored in a particular tank for many hours or days before delivery to a digestor. Care should, of course, be exercised that all of the buffer storage tanks are properly ventilated on top to avoid possible emergence of anaerobic tendencies in the stored pulp and also to avoid that any air, steam or gas pressures whatsoever can build up when air or steam pressure is applied at the bottom parts.

The dosifiers should be operated so that a full day's refuse delivery (normally received over an interval of a few hours) is discharged onto the belts $P_1$ and $P_2$ over a 24 hour (or similar) interval. The rate of discharge in tons per hour will, of course, have to be adjusted to the digestor requirements and in accordance with the specific weight of the refuse. It is desirable that the discharge rate of the dosifiers be adjustable continuously or nearly continuously over a substantial range to permit careful feed control.

As shown in FIG. 5, the belts $P_1$ and $P_2$ are horizontal and carry the ground pulp discharged from the dosifiers onto upwardly inclined conveyor belts $R_1$ and $R_2$, respectively. The feed of ground pulp from the primary grinder $G_1$ to the belt $R_1$ is indicated in FIGS. 4 and 5 by the dotted line and arrows W.

Conveyor belts $P_1$ and $P_2$ are preferably provided with sections arranged to indicate the weight of pulp carried thereon, as suggested at 46 in FIG. 5 for the belt $P_1$. Preferably, these weighing devices are not only indicators but automatic control scales (similar to the ones currently used for automatic weight control on moving belts in cement plants, foundry sands and the like) which can be set for automatic control of the dosifiers for the volume and flow of pulp discharged from buffer storage tanks Z and of the dosifiers for process and product additives discharged from the additive bins to the respective belts $P_1$ or $P_2$.

The belts $R_1$ and $R_2$ carry the pulp upwardly to a level above the height of digestors 47 and 48 and discharge the ground pulp onto horizontal conveyor belts $S_1$ and $S_2$, by means of cross-chuting to allow discharge of pulp either from belt $R_1$ to belt $S_1$ and from belt $R_2$ to belt $S_2$, or from belt $R_1$ to belt $S_2$ and from belt $R_2$ to belt $S_1$ (as indicated by the lines 44 and 45 in the flow sheet FIG. 2).

Belt $S_1$, by means of plow and chute combinations 49, 50 and 51, discharges the pulp into the digestor 47 at the first, third or fifth levels or decks, respectively, of the eight levels or decks provided in digestor 47. Similarly, the belt $S_2$, by means of plow and chute combinations 52, 53 and 54, discharges the pulp into the digestor 48 at the first, third or fifth levels or decks, respectively, of the eight levels or decks provided in the digestor 48. Belts $S_1$ and $S_2$ can also discharge into digestors 48 and 47, respectively, if desired.

In each of the digestors 47 and 48 the pulp travels at predetermined speeds over eight superposed levels or decks, the pulp passing from deck to deck as will be described hereinafter. During this travel through the digestors, the conversion of raw refuse pulp into compost is accomplished through aerobic bacterial action. Air, which may be heated to avoid loss of heat generated by and necessary to promote bacterial action, is caused to flow over the pulp on each deck, preferably in the direction opposed to the direction of the flow of pulp on the respective deck. The air flow for the top or first deck only is shown in FIG. 3 by the lines 55 and 56. The travel of pulp over successive decks is shown by the lines 57 and 58.

Partially digested pulp (in any proportion of that present) arriving at the ends of the second, fourth and sixth decks of the digestor 47 can be discharged, if desired, onto a conveyor belt $T_1$ by means of chutes 59, 60 and 61, respectively. Similarly, partially digested pulp from the second, fourth and sixth decks of the digestor 48 can be discharged, if desired, onto a conveyor belt $T_2$ by means of chutes 62, 63 and 64, respectively.

As shown in FIG. 5, the belts $T_1$ and $T_2$ are parallel, horizontal, and, at the same elevation, adjacent the digestors. After leaving the area of the digestors, the belts $T_1$ and $T_2$ become inclined upwardly to achieve an elevation above the belts $P_1$ and $P_2$, respectively, onto which they discharge the partially digested pulp for recirculation.

As shown in FIG. 2, the belts $T_1$ and $T_2$ may be provided with plows 65 and 66, respectively, to permit discharge of the pulp on belt $T_1$ onto belt $P_2$ and/or discharge of the pulp on the belt $T_2$ onto belt $P_1$, if desired.

The ends of the second decks of the digestors (chutes 59 and 62) represent approximately 25% decomposition, while the ends of the fourth and sixth decks (chutes 60, 63 and 61, 64, respectively) represent approximately 50% and 75% decomposition, respectively.

By virtue of discharge of the partially decomposed pulp on the T belts onto the P belts, as described, the P and R belts are used for both digestor feed from the buffer storage tanks and recirculation feed from one or more points in the digestors to another point or points in the same or a different digestor.

The P and R belts are also used for the feed of additives. Thus, process additives and product additives stored in bins or tanks (for liquids), such as KN, KP, KK and KX in FIG. 2, supply desired additives in desired quantities and at desired rates to the pulp feed on belts $R_1$ and $R_2$. The additive feed may, if desired, take place on belts $P_1$ and $P_2$, as shown in FIG. 5.

Process additives, such as lime or bacterial agents, may be provided to affect the composting operation in the digestors. Product additives, such as nitrogenous materials, potash and phosphorus, may be provided to yield desired characteristics to the final product, as by way of enrichment. The additives may be stored in suitable bulk storage bins or tanks and may be transferred periodically, as required, into the additive feed bins or tanks by means of suitable conveyors or pumps, such as the conveyor K. Adjustable hoppers similar to the dosifiers 40–43 (or valves) are provided for controlling additive feed onto the P belts.

The 100% composted product output from the bottom or eighth deck of the digestors 47 and 48 is discharged onto conveyor belts $X_1$ and $X_2$, respectively, which carry the product to screens $V_1$ and $V_2$, respectively. The belts $X_1$ and $X_2$ can conveniently be replaced with pipes and blowers for carrying the product to the screens. The vibrating screens are provided for separating tailings larger than a predetermined size, e.g., four mesh, from the product mass. The screened finished product is discharged from screens $V_1$ and $V_2$ into product storage areas 65 and 66 on conveyors (or preferably pneumatic blowers) $Q_1$ and $Q_2$, respectively, which discharge the product on the floor in heaps.

The oversized material or tailings caught on the vibrating screens $V_1$ and $V_2$ is discharged by chutes onto a conveyor belt Y. The conveyor belt Y may discharge the tailings selectively onto the belts $R_1$ and $R_2$, as shown in FIG. 2, or may convey the tailings to a tailing bin 67, for discharge onto belts $R_1$ and $R_2$, as shown in FIG. 5. Recirculation of the tailings is desirable because the tailings contain a large part of the bacterial leavening required for uniform maintenance of digestion.

It will be evident that the recirculation arrangements which can be adopted are virtually endless so that fine adjustment of the composting operation can be effected in order to reduce composting time in the digestors to a minimum and to ensure desired and uniform end product characteristics. One example of a recirculation arrangement is shown in FIG. 6 which is a simplified flow sheet corresponding generally to FIGS. 2 and 3.

In FIG. 6, ground pulp from buffer storage tank $Z_1$ or $Z_2$ is fed onto the first deck of digester 47 on conveyor belts $P_1$, $R_1$ and $S_1$, while ground pulp from buffer storage tank $Z_3$ or $Z_4$ is fed onto the first deck of digestor 48 on conveyor belts $P_2$, $R_2$ and $S_2$. The leading ends of the first and third decks and the rear (from a flow direction standpoint) ends of the second and fourth decks are provided with adjustable gates which can pass any desired proportion of the ground pulp advancing on the respective decks. These gates are designated 67–74.

Gates 67, 68, 71 and 74 are partially open, while the remaining gates are closed. Thus, any desired proportion of the ground pulp delivered by belt $S_1$ to the first deck of digestor 47 passes on down this deck, while the remainder falls through gate 67 directly onto the third deck, joins that part of the pulp which is delivered at this point from the second deck to the third deck, and passes successively along the third to eighth decks and is discharged from the bottom of the digestor 47. Of that pulp which travels along the first deck and thence along the second deck, any desired proportion falls through gate 68 onto the belt $T_1$, while the remainder passes onto the third and subsequent decks, joining the pulp which fell through gate 67.

Any desired proportion of the pulp reaching the first deck of digestor 48 falls through partially open gate 71 directly onto the fifth deck, from which it travels successively over the remaining decks, being discharged from the bottom of digestor 48. The remainder of the pulp on the first deck travels successively over the first-fourth decks until a portion is discharged through partially open gate 74 onto conveyor belt $T_2$, while the balance falls onto the fifth deck, joining the pulp which had fallen through gate 71. The construction of the gates is such that, while each one of them can be independently adjusted to any opening, as desired, the control of two or more of any gates can be synchronized so that the increase or decrease of openings of the synchronized gates is effected automatically to maintain the correct proportions of the respective gate openings necessary to obtain a certain predetermined rate of recirculation, or any predetermined change therein. This arrangement is particularly important for maintaining a relatively uniform height of pulp on all decks regardless of the extent of recirculation of partially decomposed material. For example: considering the recirculation of approximately 25% decomposed material, effected in digestor 47 as indicated in FIG. 6, the controls for opening of gates 67 and 68 are synchronized.

Designating as 100 the volume units of feed considered optimal by the digestor operators to maintain a certain desired height of pulp moving on the various digestor decks, and assuming that a recirculation of one-fifth (20%) of approximately 25% decomposed material is desired, the operators will set the automatic weight controls located under belt $R_1$ (indicated as 46 in FIG. 5) in such a manner that the total amount of pulp delivered by belt $S_1$ to the top of digestor 47 equals 120 volume units; the control of opening of gate 67 will be set in the proportion of 5 to 1, permitting 100 volume units of incoming pulp to pass onto the first digestor deck and 20 volume units to the third deck; the control of gate 68 will be set in the functional proportion of 4 to 1, permitting 80 volume units of approximately 25% decomposed pulp, discharged from the second deck, to pass onto the third deck and 20 volume units of approximately 25% decomposed pulp to pass to the discharge chute to the recirculation belt $T_1$. Thus the 100 volume units, representing the desired uniform height, are maintained on the first and second decks (passed through gate 67) and on the third and successive decks (20 units passed through gate 67, plus 80 units passed through gate 68).

Assuming now that the operators wish to change the recirculation proportions from one-fifth to one-quarter (25%) of approximately 25% decomposed material, then they will set the weight controls (46 in FIG. 5) to equal 125 volume units; the control of the opening of gate 67 will be set in the proportion of 4 to 1, permitting 100 volume units of incoming pulp to pass onto the first digestor deck and 25 volume units to the third deck; due to the above mentioned synchronization of the controls of gates 67 and 68, the opening of gate 68 is automatically changed to the functional proportion of 3 to 1, permitting 75 volume units of approximately 25% decomposed pulp, discharged from the second deck, to pass onto the third deck, and 25 volume units of the 25% decomposed pulp to pass to the discharge chute of belt $T_1$. The synchronization of the controls of gates 67 and 68 by the required parabolic functional ratio affords continuous automatic gate adjustment, theoretically within the whole range from 0% to 100%. In practice, adjustments of recirculation proportions between 0 and 50% will be more than ample to cover any operational requirement.

In the case of recirculation of 50% decomposed material, as described above relative to digestor 48 in FIG. 6, gates 71 and 74 are synchronized in the same way as were gates 67 and 68 on digestor 47 for the recirculation of 25% decomposed material. Synchronization of gates can be applied and changed to any selected two gates on a digestor, which allows the switching of the same digestor from recirculation of 25% decomposed material to that of 50% or 75% decomposed material, as may be required by operational needs.

Gate openings can, of course, be under manual control if desired.

The approximately 25% composted pulp on conveyor $T_1$ is carried to conveyor $P_1$ for delivery, with fresh pulp from buffer storage tank $Z_1$ or $Z_2$, to the first deck of digestor 47. The approximately 50% composted pulp on conveyor belt $T_2$ is discharged onto conveyor $P_1$ for delivery, with fresh pulp from buffer storage tank $Z_3$ or $Z_4$, to the first deck of digestor 48. Cross-chuting arrangements between belts $T_1$ and $T_2$ and $P_1$ and $P_2$ (marked 65 and 66 on FIG. 2) permit change of recirculation feed between digestors 47 and 48. In the event of such cross-recirculation between digestors, belt $T_1$ delivers 25% decomposed material from digestor 47 to belt $P_2$, which carries it, with fresh pulp, to digestor 48, and, conversely, belt $T_2$ discharges 50% decomposed material from digestor 48 to belt $P_1$, which carries it to digestor 47.

In FIG. 6, all desired additives are supplied at the "zero percent composted" point, i.e., with the fresh pulp from the buffer storage tanks.

Efficient operation of the digestors may require, however, that product additives should be introduced into the digestor not at the "zero percent composted" point but at a later digestive phase, such as, e.g., at the "50% composted" point, to avoid interference of certain chemical reactions between product additives and the pulp in the first, most virulent, phase of decomposition on the upper digestor decks and to take advantage of the volume and weight reduction of the pulp that takes place mostly on the upper decks, by compensating it through the volume and weight addition of process additives on the lower decks only.

An example for one possibility of such arrangements is given in FIG. 7.

All fresh pulp from the buffer storage tanks is delivered on the $P_1$, $R_1$ and $S_1$ belts to the first decks of both digestors 47 and 48. Gates 67 and 71 are partially open so that a proportion of the fresh pulp passes through these gates directly onto the third decks while the remainder passes successively along the first and second decks. Gates 68 and 72 are partially open so that a proportion of the pulp reaching the ends of the seconds decks passes through these gates and onto conveyor belt $T_1$, the remainder falling onto the third decks. In other words, the first two decks of both digestors 47 and 48 are arranged for recirculation of 25% composted material, as shown for digestor 47 on FIG. 6.

Gates 69 and 73 however are fully closed so that all of the pulp on the third decks passes successively along the third and fourth decks. Gates 70 and 74 are fully open so that all of the pulp reaching the ends of the fourth decks is discharged onto conveyor belt $T_2$.

The 25% composted pulp on belt $T_1$ from both digestors is delivered to belt $P_1$ for delivery along with fresh pulp and possibly desired process additives to the first decks of the digestors. The 50% composted pulp on belt $T_2$ from both digestors is delivered to belt $P_2$ and is returned to the fourth decks of the digestors on belts $P_2$, $R_2$ and $S_2$ together with the desired product additives. Hence, withdrawal of the 50% composted pulp is effected to permit addition of the additives at this point in the composting process. The pulp and additives delivered to the fourth decks pass successively along the fourth-eighth decks and are discharged from the respective digestors.

In general, it will be desirable to provide also for recirculation at the 75% composting point in order to ensure full flexibility in composting adjustment. However, for simplicity, 75% recirculation has not been illustrated in FIGS. 6 and 7.

The function of the digestors is to convert the fresh ground pulp into compost through aerobic bacterial action. Uniform and desired characteristics of the final product are achieved through proper digestor design and through appropriate recirculation and the addition of process and product additives at appropriate points in the composting operation.

Addition of aerobic bacteria to the pulp and the forced flow of air over the mass of pulp are desirable, but alone do not afford an adequate composting operation for handling commercial quantities of municipal refuse and the like. It is desirable that composting be complete in a period of one day or less but in any event less than about three days. Of course, the longer the composting interval the greater must be the digestor capacity. Thus, if the composting period is about three days, the digestors have to be large enough to hold at one time about three days' delivery of waste material. With a digestor designed in accordance with the invention, this would be commercially feasible, but any longer time would present economic difficulties which would make a commercially feasible operation very difficult. It will be evident that a composting period of one day or less is to be preferred.

In general, the duration of the composting cycle is conversely proportional to the surface area of the composting material exposed to the oxygen of the air at any one time. This general rule is, of course, subject to certain limits. Thus, the material cannot be ground smaller than a minimum mesh size because of the risk of organic and bacterial alteration and also because of the necessity of avoiding packing and maintaining reasonable moisture contents. It is also necessary to maintain certain temperature conditions during the composting operation, either through heat generated by the bacterial action or a combination of such heat and additional heat supplied externally, as by using a forced flow of heated air over the pulp being decomposed. In general, the temperature required will vary from ordinary room temperature up to about 200° F. Maintaining desired temperatures in a practical operation requires maintenance of a minimum depth of pulp being composted.

For instance, optimal composting of municipal refuse in a composting time of about 24 hours can be achieved in a digestor constructed in accordance with the invention, but the following limits should be observed:

|  | Minimum | Maximum |
|---|---|---|
| Size of grind......mesh.. | 12 | 4 |
| Depth of material......inches.. | 8 | 16 |
| Speed of plow......ft./min.. | 10 | 200 |

The volume of material to be handled per day and the moisture content and specific weight of the material are additional factors that need to be taken into account in establishing the specifications of any particular digestor.

One form of digestor constructed in accordance with the invention is illustrated in FIGS. 7–15. The digestor illustrated is intended to handle city refuse which has been ground so that approximately 90% will pass through a 4 mesh screen and the balance through a ¾ inch screen. The pulp supplied to the digestor has little free moisture but contains approximately 70% to 80% bound moisture and weighs between 30 and 50 pounds per cubic foot. The pulp, as delivered to the digestor, is at normal room temperature, i.e., about 60–70° F. During processing the material will increase in temperature, but will not exceed about 210° F.

The digestor illustrated is a rectangular steel structure about 200′ long, 12′ wide and 36′ high, and will be completely enclosed, as by corrugated metal siding and roofing.

Within the digestor there are eight chambers through which the pulp passes successively and in which composting takes place. Each chamber is provided with a pulp supporting deck of steel or other suitable material, these decks being designated 101–108. The pulp is carried on the decks at a depth of approximately 12 inches and is continuously agitated and conveyed by four chain conveyor and rake assemblies designated 109, 110, 111 and 112. These assemblies are shown schematically in FIGS. 8–11, but one assembly is shown in detail in FIGS. 12–15.

With the construction described, each chamber will accommodate about 2000 cubic feet of material, or about 16,000 cubic feet per digestor. The incoming feed to the digestor will be of the order of 21 tons per hour for a retention time of 20 hours and of the order of 6 tons per hour for a retention time of 70 hours, based on a specific weight of 50 pounds per cubic foot of incoming pulp.

The pulp supporting decks extend longitudinally of the digestor and are supported by suitable structural members, as shown, for example, at 113. The decks are preferably provided with alternate longitudinally extending reinforcing ridges and troughs, as best shown in FIG. 10. The ridges might be about 3″ above the level of the troughs and the width of the troughs and ridges might be about 6″. The sides of the ridges are preferably disposed at an angle of about 45°. Spaces between reinforcing ridges can be filled out with abrasive-resistant cement or other suitable material to provide an even flooring for the deck and thus avoid accumulation of residual pulp, as shown exemplified on deck 107 in FIG. 10. As best shown in FIG. 14, the decks are provided with internal side plates 114 which serve to prevent the pulp from falling into the chain compartment 143 as the pulp is advanced. The 12″ pulp bed height referred to previously extends upwardly from the tops of the ridges.

Figure 9:
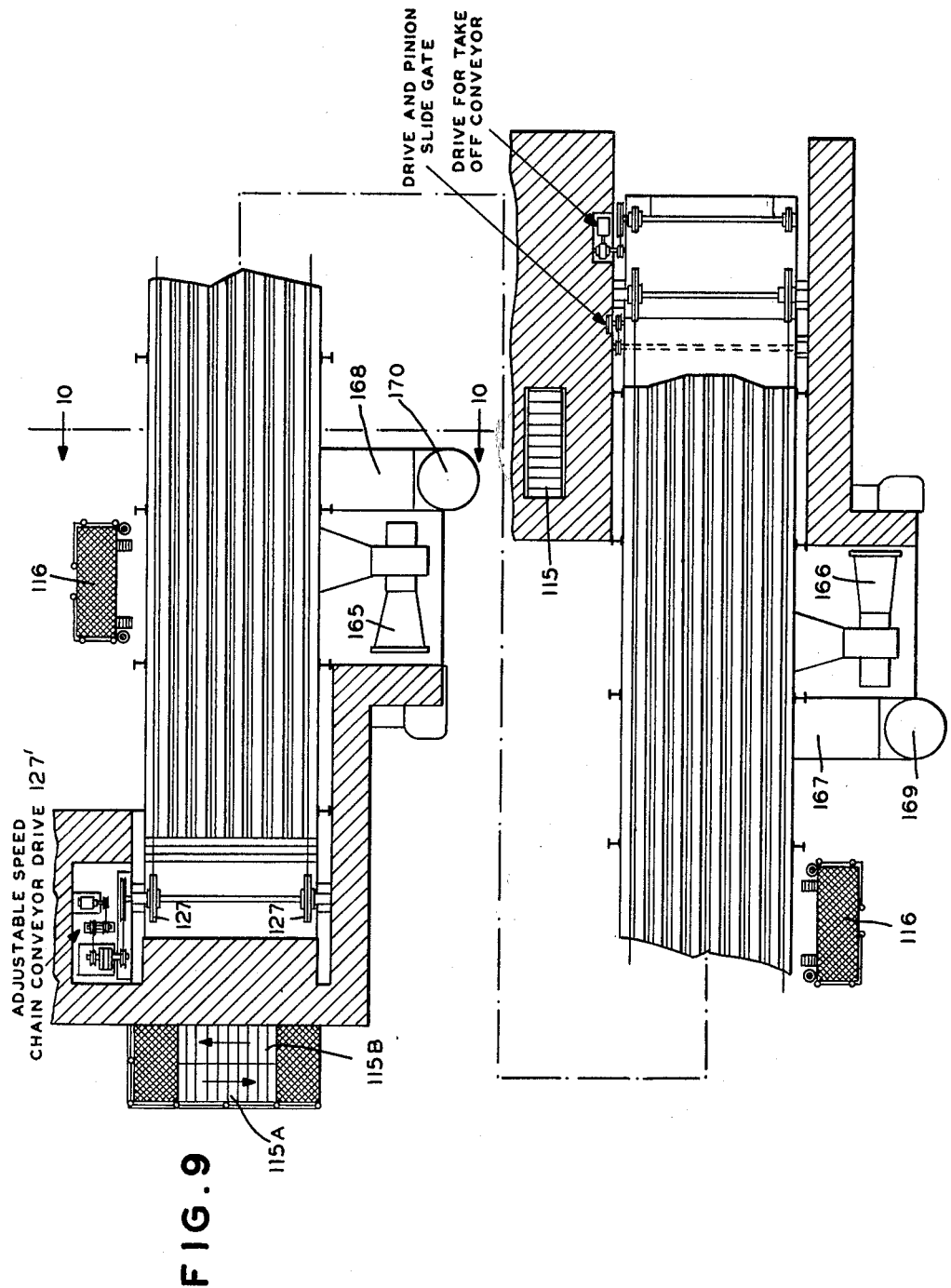
FIG. 9 is a sectional view taken along the line 9—9 of FIG. 8.

Suitable work platforms and access ladders or stairways may be provided adjacent the pulp carrying decks, one stairway being illustrated at 115 in FIGS. 9 and 11 and a pair of stairways being illutrated at 115A and 115B in FIGS. 8 and 9. Horizontally and vertically movable service platforms may also be provided, as shown at 116 in FIGS. 9 and 10: These serve for servicing, maintenance and inspection of all digestor floors using the windows and removable side panels conveniently placed at suitable distances along the walls of the digestors.

Normally, two digestors will be provided side by side in symmetrical arrangement. Thus a second digestor would be provided in FIG. 11, the arrangement being symmetrical about the center line of the ladders 115.

Incoming conveyor belts $S_1$ and $S_2$ carry the pulp to positions over deck 101, and pulp may be discharged onto the deck 101 from either or both of these belts by means of plows. The plows 117, 118 and 119 for the belt $S_2$ are shown in FIG. 11, while the plow 117 for belt $S_2$ and a plow 120 for belt $S_1$ are shown in FIG. 8. The plows are preferably arranged to discharge pulp across nearly the whole width of deck 101, but at a longitudinal position somewhat ahead of a slide gate 121.

The slide gate 121 is disposed beneath an aperture 122 in the deck 101. The gate 121, as shown, is fully closed but it may be moved in a longitudinal direction to expose all or any portion of the aperture 122 whereby pulp will fall through the exposed portion of the aperture. The slide gate 121, and the other slide gates 123, 124 and 125 provided for the decks 102, 103 and 104, respectively, are preferably supported for longitudinal movement by pinions acting in racks supported from the digestor frame structure. The rack and pinion arrangement is shown only schematically. The gates may be manually or power operated.

The gates 121 and 125 are directly superposed. Hence, if both gates are fully open, pulp delivered from conveyor $S_1$ or $S_2$ will fall directly onto the fifth deck 105. By full or partial closing of an appropriate gate, the delivered pulp may be cause to collect on any one of the decks 101, 103 or 105 in any desired proportion.

With gate 121 closed, the pulp plowed off the delivery conveyor will collect on deck 101. The pulp on deck 101 will be advanced longitudinally along this deck and will be agitated through the rake conveyor arrangement 109, as illustrated in FIGS. 12–15. The rake conveyor arrangement 109 carries the pulp along deck 101 toward the left in FIG. 8 until the pulp reaches the end of deck 101 at point 126. The pulp then falls onto deck 102, the extreme end of which extends beyond the end of the deck 101. The same rake conveyor 109, after passing around pulleys at the left end, as shown schematically at 127, advances the pulp toward the right along deck 102, agitating the pulp on this deck. A corresponding pulley arrangement at the right end is indicated schematically at 128. In addition to agitation of the pulp, the rake also thoroughly intermixes the pulp and whatever additives are provided.

Pivoted baffles are preferably provided at about the desired pulp level adjacent each end of each deck to prevent short circuiting of the forced air flow over the various beds of pulp. In FIG. 8, baffles 129 and 130 are shown at the right end of deck 101 and baffles 131 and 132 are shown at the left end thereof. The baffles are preferably metal plates which extend completely across the decks and are pivoted to prevent excessive compacting of pulp in case relatively high humps of pulp should exist at any point.

As best shown in FIGS. 12, 13 and 14, the rakes comprise a tubular beam 133 formed by longitudinally spaced parallel steel tubes 134 and 135 joined by a flat web 136. The tubular beam 133 extends across substantially the full deck width and is supported on each end through attachment to a rectangular steel frame 137. Longitudinally spaced rollers 138 and 139 are mounted for rotation on shafts 140 and 141, respectively. The shafts 140 and 141 are supported in apertures provided in the side plates of the frame 137. The rollers 138 and 139 ride on a rail 142 provided at each side of each deck. The rails 142 are supported by suitable longitudinally spaced standards 143 provided at intervals along the sides of each deck. Upper rails 144 may be provided to prevent accidental derailment of the rollers 138 and 139. Normally, the rails 144 are not in contact with the rollers.

An endless chain 145 is provided outboard of the rollers 138 and 139 at each side of the rake conveyor. The endless chains for the first two decks pass over the pulleys or sprockets 127 and 128 (FIG. 8), either or both of which may be powered to advance the chains and with them the rakes. The endless chains are attached to the outer side plates of the frames 137 by means of bolts 146 and 147. The bolts 146 and 147 serve to support the chains from the rake assemblies and to advance the rake assemblies as the chains are powered in a longitudinal direction.

As best shown in FIGS. 12 and 14, a first set of laterally spaced rake teeth 148 is provided extending upwardly from the web 136 and a similar set of teeth 149 is provided extending downwardly from the web 136. Successive teeth in each set are preferably relatively closely spaced, e.g., about 3 inches. The teeth of the two sets are preferably staggered, as shown, so that successive teeth along the web belong to different sets. The individual teeth may have any suitable configuration for agitating and moving the pulp, but preferably are formed from square to rectangular bars bent to an arcuate shape in cross section, as shown. The bases of the individual teeth pass through apertures spaced along the center line of the web and are attached to the web by means of collars 150 and nuts 151 acting on opposite sides of the web.

As shown in FIG. 14, the vertical height of the rake teeth is selected so that the teeth extend substantially to the level of the ridges in the decks over which the rakes travel.

As mentioned previously, each rake assembly agitates and advances the pulp on two adjacent decks. Thus, in traveling over one deck, one set of teeth will contact the pulp, while in passing over the other deck the other set of teeth will contact the pulp. The endless chain is carried in a semicircular path from a position over one of the decks to a position over the other deck at the ends of the decks, e.g., by the sprockets or pulleys 127 and 128. The rails likewise carry the rakes around the same semicircular path at each end of the decks.

To ensure proper advancement and agitation of the pulp, each conveyor-rake assembly should be provided with a plurality of rake sets spaced longitudinally along the conveyor endless chains. The number of such rake sets will depend on a number of factors such as rake speed and teeth spacing. For example, four sets of rakes might be provided for each pair of decks, the four rakes being equally spaced longitudinally along the endless chains which advance the same. However, in most cases a larger number of rakes will be used, e.g., 12 or 24 per pair of decks. The endless chains should be powered to advance at a relatively rapid rate, e.g., 118 feet per minute. For this purpose, an adjustable speed chain conveyor drive is shown at 127′ in FIG. 9. Of course, the body of pulp advances longitudinally at a much slower rate. The endless chain speed is preferably adjustable over a wide range.

To facilitate maintenance of a level pulp bed and also to provide stability, a series of bed levelers 152 may be carried on the rails 142 and advanced by the endless chains 145. A bed leveler might be provided between rakes at a spacing of, for example, 20 feet. As best shown in FIGS. 13 and 15, each bed leveler comprises a pipe 153 extending substantially completely across the deck at the same height as the beam 133, which height is approximately equal to the desired pulp bed height, e.g., one foot. The pipe 153 is affixed at each end to a bar 154 which is bolted to a generally U-shaped bar 155, which is in turn attached to the endless chain 145 by means of bolts 155A and 155B.

A short shaft 156 is carried in each end of the pipe 153 and extends into a central aperture provided in the bar 155. The shaft 156 carries a roller 157 which rolls along the track 142 to support the bed leveler.

As mentioned previously, pulp is advanced toward the left (FIG. 8) along the deck 101 by the rake assembly 109, falls to the deck 102, and is then advanced to the right along deck 102 by the rake assembly 109. If the gate 123 is completely or partially open, some or all of the pulp will fall through the gate opening onto deck 103. If the gate 123 is completely or partially closed, some or all of the pulp will pass over the gate and fall onto a bar flight or a belt conveyor 158 which carries the pulp deposited thereon into a mouth 159 of a vertical chute 160. The chute 160 is provided with a movable discharge section 161 which delivers pulp onto either conveyor $T_1$ or $T_2$, as desired.

Pulp on deck 103 is advanced to the left (FIG. 8) by rake assembly 110, falls to deck 104, and is advanced to the right on deck 104 by rake assembly 110. Pulp reaching the right end of deck 104 will either fall to deck 105 or be carried into chute 160 by a belt conveyor 162, or both, depending upon the position of slide gate 125.

Pulp on deck 105 is carried to the left (FIG. 8) by rake assembly 111, falls to deck 106, and is advanced to the right on deck 106 by rake assembly 111. If desired, recirculation at the 75% compost point may be obtained by providing a slide gate and conveyor for deck 106 similar to the gate 125 and conveyor 162. But, as shown, pulp reaching the end of deck 106 at point 163 falls to deck 107.

Pulp on deck 107 is advanced to the left (FIG. 8) by rake assembly 112, falls onto deck 108, and is advanced to the right on deck 108 by rake assembly 112. Pulp reaching the right end of deck 108 will fall onto conveyor X₁ and/or conveyor X₂ depending upon the position of slide gate 164.

Adequate air flow over the beds of pulp is necessary to assure proper aerobic bacterial action and to remove evolved vapor and other gaseous matter. For this purpose, each deck is provided with a blower which forces air over the bed and an exhaust pipe which removes the moisture laden air to an exhaust manifold. The pair of blowers serving the chambers over the decks 101 and 102 are shown at 165 and 166, respectively, in FIG. 9, the corresponding exhaust pipes at 167 and 168, respectively, and the exhaust manifolds at 169 and 170, respectively.

The feed air delivered from the blowers is preferably heated to facilitate moisture removal and to accelerate bacterial action. The air may conveniently be heated by being passed over steam carrying coils located in association with the blower housings. As shown, the air flows counter-current to the pulp. The quantity and temperature of air required will vary widely with conditions. Assuming an initial pulp moisture content of 80% maximum, a feed weight of 50 lbs. per cubic foot maximum, a final moisture content of 30%, about one-half of total moisture released from pulp being converted into other chemical forms and the balance being released as moisture vapor, and an average inlet air at 60° F. and 50% relative humidity, then for the digestor described above about 60,000 cubic feet per minute of air at about 120° F. will be found adequate to remove substantially all liberated moisture from above the digestor pulp beds. For example, the blowers for the first four beds might each deliver 10,000 c.f.m. of air at 120° F., while the blowers for the lower four beds might each deliver 5000 c.f.m. of air at 120° F. It is desirable that provision be made to adjust the air flow and air temperature individually over each bed to assure proper composting.

In the digestors described above as an example of a construction in accordance with the invention, there are provided a total of sixteen decks (eight per digestor), each deck being 200 feet long and 12 feet wide. This yields a total deck surface area of 38,400 square feet. Assuming a pulp height maintained at one foot on each deck, the retention capacity will be 38,400 cubic feet. Assuming a feed pulp having a specific weight of 50 pounds per cubic foot, the total holding capacity will be equivalent to 810 tons of pulp. The retention time required in the digestors will vary with a number of factors, including moisture content, chemical content and particle size. Retention time for typical urban refuse might vary from about 16 hours to 48 hours.

The rakes which advance the pulp along the decks perform two principal functions, that of linear translation of the pulp and that of agitation or churning of the pulp. If no agitation or churning occurred, the linear rake speed (for 1600 foot total deck length per digestor) for various retention times would be as set forth in Table I:

| Retention time, hours | Rake speed | |
|---|---|---|
| | Feet per hour | Feet per minute |
| 16 | 100 | 1.66 |
| 32 | 50 | .83 |
| 48 | 33 | .55 |

But, because of the desired churning action, the rake tines are not designed to yield a pulp linear translation approaching the rake linear speed. The efficiency of the linear translating function of the rakes decreases generally in proportion to increase in churning efficiency. The ratio between linear translating efficiency and churning efficiency may be termed "rake efficiency." The rake efficiency will, of course, vary with the positions, shape and numbers of the rake tines. For a given rake construction, the rake efficiency will also vary with the digestive quality and characteristics of the pulp. In general, rake efficiency will preferably be in the range of about 1/20 to 1/120. For a rake construction of the type described above and with four rakes per deck (one each 50 feet), the rake (or driving chain) speed required for various retention times and various rake efficiencies are set forth in Table II:

| Retention time, hours | Rake efficiency | Rake speed, feet per minute |
|---|---|---|
| 16 | 1/20 | 33 |
| 16 | 1/60 | 100 |
| 16 | 1/120 | 200 |
| 32 | 1/20 | 16 |
| 32 | 1/60 | 50 |
| 32 | 1/120 | 100 |
| 48 | 1/20 | 11 |
| 48 | 1/60 | 33 |
| 48 | 1/120 | 66 |

Rake efficiency can be improved by increasing the number of rakes per chain, i.e., per pair of decks, but the increase in efficiency is not directly proportional to the increase in number of rakes but rather increases as a generally parabolic function.

A typical urban refuse (mixed garbage and trash) converted into pulp and treated with appropriate process additives might have the following approximate average physical and chemical characteristics:

Particle size _____ mesh __ 6
Specific weight _____ lbs./cu.ft __ 40–50
Moisture content _____ percent __ 70–80
pH _____ 7

For such a material a retention time of about 32 hours would be desirable. This need not be achieved by continuous operation but might be achieved, for example, by two 16 hour periods separated by 8 hours of down time. A pulp height of one foot with an effective chain speed of 50 feet per minute might be used.

Determination of the progress of decomposition of the pulp may be made by standard laboratory tests, e.g., the carbon-nitrogen ratio tests, the permanganate method, etc. An indirect but useful indication of the progress of conversion can be obtained by measuring the pulp temperature on the different decks. In this connection, the temperatures on the second and third decks will generally be the most significant. In general, the temperature of the pulp around the center of the second deck will preferably be about 110° F., and around the center of the third deck will preferably be about 135° F.

Should the second and third deck pulp temperatures fall substantially below these values, the digestor chain speeds should be reduced until the temperatures return to normal. Should the pulp temperatures, especially on the third deck, rise substantially above normal, chain speed should be increased until the temperatures drop to normal. Instead of altering chain speed, the pulp height may be altered, as by raising or lowering the bars 153.

By way of illustration, two specific examples of pulp and product additive formulations will now be set forth, based upon the following characteristics:

The waste pulp, fed to the digestors, contains 75% water (bound moisture), 0.2% N, 0.2% $P_2O_5$ and 0.2% $K_2O$—and the moisture in the finished product is reduced to 37% water.

Product additive for nitrogen is nitrogen solution, containing 20% water and 32% plantfood N, with 0% $NH_3$, 45% $NH_4NO_3$ and 35% urea, and that the loss of nitrogen in the process is 0.5%.

Product additive for phosphorus is triple superphosphate, containing 5% water and 47% $P_2O_5$ with no loss by reversion.

Product additive for potash is muriate of potash, containing 1% water and 60% $K_2O$.

Example A

This example is to secure as an end product a 5-3-2 fertilizer, i.e., 5N; 3P$_2$O$_5$; 2K$_2$O:

| | Total Content (pounds) | Constituents (pounds) | | | | |
|---|---|---|---|---|---|---|
| | | Water | Dry Material | Plant foods | | |
| | | | | N | P$_2$O$_5$ | K$_2$O |
| Pulp | 3,447 | 2,585 | 862 | 7 | 7 | 7 |
| Nitrogen solution | 294 | 59 | 235 | 94 | | |
| Triple superphosphate | 113 | 5 | 108 | | 53 | |
| Muriate of potash | 55 | 0 | 55 | | | 33 |
| Totals | 3,909 | 2,649 | 1,260 | 101 | 60 | 40 |
| Loss | −1,909 | −1,909 | | −1 | | |
| Finished product | 2,000 | 740 | 1,260 | 100 | 60 | 40 |

Example B

This example is to secure as an end product a 4-2-2 fertilizer, i.e., 4N; 2P$_2$O$_5$; 2K$_2$O:

| | Total Content (pounds) | Constituents (pounds) | | | | |
|---|---|---|---|---|---|---|
| | | Water | Dry Material | Plant foods | | |
| | | | | N | P$_2$O$_5$ | K$_2$O |
| Pulp | 3,836 | 2,877 | 959 | 7.7 | 7.7 | 7.7 |
| Nitrogen solution | 226 | 45 | 181 | 72.3 | | |
| Triple superphosphate | 69 | 3 | 66 | | 32.3 | |
| Muriate of potash | 54 | 0 | 54 | | | 32.3 |
| Totals | 4,185 | 2,925 | 1,260 | 80 | 40 | 40 |
| Loss | −2,185 | −2,185 | | 0 | | |
| Finished product | 2,000 | 740 | 1,260 | 80 | 40 | 40 |

The digestor operation should be conducted so that the end product is substantially completely decomposed or composted, i.e., the pulp should contain substantially no more food for the action of the decomposing aerobic bacteria. Stated in another way, composting should be carried to a point where the end product is stable, i.e., will not generate excessive heat.

Another characteristic of the end product which should be considered is its granularity. This characteristic will depend on the end use, but, in general, the end product should have a particle size which will pass satisfactorily through the spreader openings of fertilizer spreaders in general commercial use. The product should not be too powdery, because such a product would tend to pack in the spreader.

Bacteria, as a process additive, will be of particular importance in the starting up of digestor operation when empty and in curing a situation in which, because of deficiency in action of aerobic bacteria, the pulp in the digestor turns anaerobic. A number of strains of bacteria can be used with advantage. The following table sets forth a number of suitable strains, these being available from the United States Department of Agriculture:

Thermophilics, such as:
    Thermoamylolyticus Coolhas
    Thermodiastaticus Bergey
    Thermophile No. 121
Nitrifying bacteria:
    The Rhizobium category, such as
        *leguminosarum* Frank
        *melilot* Dangeard
        *Radicicoli* Beijerinck
    The Azotobacter category, such as
        *chroococcum* Beijerinck
        *woodstownii* Lipman
        *winogradskyi* Buchanan For decomposing cellulose compounds, such as:
    *Aspergillus japonicus*
    *Actinomyces diastaticus* Krainsky
    *Bacillus cellulosae* Dissolvens
For decomposing sulphur compounds, the Thiobacillus category, such as:
    *thiooxidans* Waksman-Joffre
    *thioparus* Beijerinck
For conversion of proteins and fats, such as:
    *protominobacter rubrum* Den Doren De Jongh
    *Bacillus nondiastaticus* Bergey
    *Bacillus tostus* Blau
Dosification as indicated in the Rosselet-Bircher comparative tabulations.

The action and presence of some of these bacteria are not limited to their function as process additives, but will remain as product additives in the finished product, enhancing its organic quality as fertilizer. This refers mainly to the thermophilic, Rhizobium and Azotobacter categories. In addition, other strains, developed by commercial laboratories and others for agricultural uses, can be used as product or process additives.

The term "ground pulp" is used in the specification and claims to describe the comminuted waste material supplied to the digestors. But it should be understood that this expression is used in a broad sense and includes comminuted waste material prepared for delivery to the digestors through the use of comminuting mechanisms other than those which would most properly be called grinders. Hence the step of "grinding" the waste material and the "ground pulp" itself should be considered as including other comminuting mechanisms and comminuted waste material prepared thereby.

While the invention has been described in connection with specific embodiments thereof and in specific uses, various modifications thereof will occur to those skilled in the art without departing from the spirit and scope of the invention as set forth in the appended claims.

What is claimed is:

1. The method of converting organic waste material into an organic fertilizer, comprising the steps of receiving said waste material in a receiving area, advancing said waste material from said receiving area to a grinding area at a rate not less than about the rate of receipt of said waste material in said receiving area thereby avoiding substantial agglomeration of said waste material in said receiving area, grinding said waste material delivered to said grinding area to produce a ground pulp, accumulating said ground pulp in a storage zone, withdrawing ground pulp from said storage zone at a rate dependent on the feed requirements of a subsequent decomposition step and independent of said rate of advance of said waste material, delivering said withdrawn ground pulp to a digestion zone formed by a plurality of elongated superposed stationary supporting surfaces, advancing said delivered ground pulp successively along said surfaces in a direction parallel to the length thereof, maintaining air spaces above said ground pulp on each of said surfaces, continually agitating said ground pulp while advancing the same over said surfaces to present all portions of said ground pulp repeatedly to the air above said ground pulp whereby substantially complete decomposition of said ground pulp occurs under the action of aerobic bacteria in said ground pulp, passing air through the spaces above said ground pulp, the volume, temperature and rate of flow of said air being selected to remove substantially all vapor and gaseous matter evolved from said ground pulp and to assure proper decomposition of said ground pulp, adding nitrogenous material to the ground pulp in said digestion zone at a point in the advance thereof over said surfaces at which appreciable but not complete decomposition of said ground pulp has occurred, said point being selected to avoid chemical reaction between said nitrogenous material and substantially undecomposed ground pulp, and withdrawing said ground pulp from said digestion zone when said ground pulp is substantially completely decomposed.

2. The method of converting organic waste material into an organic fertilizer, comprising the steps of receiving said waste material in a receiving area, advancing said waste material from said receiving area to a grinding area at a rate not less than about the rate of receipt of said waste material in said receiving area thereby avoiding substantial agglomeration of said waste material in said receiving area, grinding said waste material delivered to said grinding area to produce a ground pulp having a particle size lying in the range of about 4 to 12 mesh, accumulating said ground pulp in a storage zone, withdrawing ground pulp from said storage zone at a rate dependent on the feed requirements of a subsequent decomposition step and independent of said rate of advance of said waste material, delivering said withdrawn ground pulp to a digestion zone formed by a plurality of elongated superposed stationary supporting surfaces, advancing said delivered ground pulp successively along said surfaces in a direction parallel to the length thereof, maintaining said ground pulp on said surfaces at a substantially constant depth lying in the range of about 8 to 16 inches while maintaining air spaces above said ground pulp on each of said surfaces, continually agitating said ground pulp while advancing the same over said surfaces to present all portions of said ground pulp repeatedly to the air above said ground pulp whereby substantially complete decomposition of said ground pulp occurs under the action of aerobic bacteria in said ground pulp, passing heated air through the spaces above said ground pulp, the volume, temperature and rate of flow of said air being selected to remove substantially all vapor and gaseous matter evolved from said ground pulp and to assure proper decomposition of said ground pulp, adding nitrogeneous material to the ground pulp in said digestion zone at a point in the advance thereof over said surfaces at which appreciable but not complete decomposition of said ground pulp has occurred, said point corresponding to a later digestive phase relative to the substantially undecomposed condition of said ground pulp as delivered to said digestion zone, and withdrawing said ground pulp from said digestion zone when said ground pulp is substantially completely decomposed.

3. The method of converting organic waste material into an organic fertilizer, comprising the steps of receiving said waste material in a receiving area, advancing said waste material from said receiving area to a grinding area at a rate not less than about the rate of receipt of said waste material in said receiving area thereby avoiding substantial agglomeration of said waste material in said receiving area, grinding said waste material delivered to said grinding area to produce a ground pulp having a particle size lying in the range of about 4 to 12 mesh, accumulating said ground pulp in a storage zone, withdrawing ground pulp from said storage zone at a rate dependent on the feed requirements of a subsequent decomposition step and independent of said rate of advance of said waste material, delivering said withdrawn ground pulp to a digestion zone formed by a plurality of elongated superposed stationary supporting surfaces, advancing said delivered ground pulp successively along said surfaces in a direction parallel to the length thereof, maintaining said ground pulp on said surfaces at a substantially constant depth lying in the range of about 8 to 16 inches, maintaining air spaces above said ground pulp on each of said surfaces, continually agitating said ground pulp while advancing the same over said surfaces to present all portions of said ground pulp repeatedly to the air above said ground pulp whereby substantially complete decomposition of said ground pulp occurs under the action of aerobic bacteria in said ground pulp, said steps of advancing said ground pulp over said surfaces and agitating said ground pulp being accomplished by passing through said ground pulp a succession of toothed rakes traveling in a direction parallel to the length of said surfaces and at a speed lying within the range of about 10 to 200 feet per minute, passing heated air through the spaces above said ground pulp, the volume, temperature and rate of flow of said air being selected to remove substantially all vapor and gaseous matter evolved from said ground pulp and to assure proper decomposition of said ground pulp, adding nitrogenous material to the ground pulp in said digestion zone at a point in the advance thereof over said surfaces at which appreciable but not complete decomposition of said ground pulp has occurred, said point being selected to avoid chemical reaction between said nitrogenous material and substantially undecomposed ground pulp, and withdrawing said ground pulp from said digestion zone when said ground pulp is substantially completely decomposed.

4. The method of converting organic waste material into an organic fertilizer, comprising the steps of receiving said waste material in a receiving area, advancing said waste material from said receiving area to a grinding area at a rate not less than about the rate of receipt of said waste material in said receiving area thereby avoiding substantial agglomeration of said waste material in said receiving area, grinding said waste material delivered to said grinding area to produce a ground pulp having a particle size lying in the range of about 4 to 12 mesh, separating from said ground pulp pieces of metal and other hard particles larger than a predetermined size, accumulating said ground pulp in a storage zone, maintaining ta least a substantial minimum moisture content in said accumulated ground pulp in said storage zone, withdrawing ground pulp from said storage zone at a rate dependent on the feed requirements of a subsequent decomposition step and independent of said rate of advance of said waste material, delivering said withdrawn ground pulp to a digestion zone formed by a plurality of elongated superposed stationary supporting surfaces, advancing said delivered ground pulp successively along said surfaces in a direction parallel to the length thereof by passing therethrough a succession of toothed rakes traveling in a direction parallel to the length of said surfaces, maintaining said ground pulp on said surfaces at a substantially constant depth lying in the range of about 8 to 16 inches, maintaining air spaces above said ground pulp on each of said surfaces, passage of said rakes through said ground pulp continually agitating said ground pulp while the same is being advanced over said surfaces to present all portions of said ground pulp repeatedly to the air above said ground pulp whereby substantially complete decomposition of said ground pulp occurs under the action of aerobic bacteria in said ground pulp, passing heated air through the spaces above said ground pulp, the volume, temperature and rate of flow of said air being selected to remove substantially all vapor and gaseous matter evolved from said ground pulp and to assure proper decomposition of said ground pulp, adding nitrogenous material to the ground pulp in said digestion zone at a point in the advance thereof over said surfaces at which appreciable but not complete decomposition of said ground pulp has occurred, said point being selected to avoid chemical reaction between said nitrogeneous material and substantially undecomposed ground pulp, and withdrawing said ground pulp from said digestion zone when said ground pulp is substantially completely decomposed.

5. The method set forth in claim 4, comprising the steps of withdrawing a portion of said ground pulp from said digestion zone said withdrawn portion of said ground pulp having achieved a predetermined stage of partial decomposition at the time of withdrawal thereof and returning said withdrawn portion to said digestion zone at an area corresponding to a different degree of decomposition than said withdrawn portion.

6. The method of converting organic waste material into an organic fertilizer, comprising the steps of receiving said waste material in a receiving area, advancing said waste material from said receiving area to a grinding area at a rate not less than about the rate of receipt of said waste material in said receiving area thereby avoiding substantial agglomeration of said waste material in said receiving area, grinding said waste material delivered to said grinding area to produce a ground pulp having a particle size lying in the range of about 4 to 12 mesh, accumulating said ground pulp in a storage zone, withdrawing ground pulp from said storage zone at a rate dependent on the feed requirements of a subsequent decomposition step and independent of said rate of advance of said waste material, delivering said withdrawn ground pulp to a digestion zone formed by a plurality of elongated superposed stationary supporting surfaces, advancing said delivered ground pulp successively along said surfaces in a direction parallel to the length thereof, maintaining said ground pulp on said surfaces at a substantially constant depth lying in the range of about 8 to 16 inches, maintaining air spaces above said ground pulp on each of said surfaces, continually agitating said ground pulp while advancing the same over said surfaces to present all portions of said ground pulp repeatedly to the air above said ground pulp whereby substantially complete decomposition of said ground pulp occurs under the action of aerobic bacteria in said ground pulp, passing heated air through the spaces above said ground pulp, the volume, temperature and rate of flow of said air being selected to remove substantially all vapor and gaseous matter evolved from said ground pulp and to assure proper decomposition of said ground pulp, periodically measuring the temperature and acidity of the partially decomposed ground pulp at a plurality of spaced points in the advance thereof over said surfaces to determine the degree of decomposition of said ground pulp at said spaced points, adding nitrogenous material to the ground pulp in said digestion zone at a point in the advance thereof over said surfaces at which appreciable but not complete decomposition of said ground pulp has occurred, said point being selected to avoid chemical reaction between said nitrogenous material and substantially undecomposed ground pulp, and withdrawing said ground pulp from said digestion zone when said ground pulp is substantially completely decomposed.

7. The method of converting organic waste material into an organic fertilizer, comprising the steps of receiving said waste material in a receiving area, advancing said waste material from said receiving area to a grinding area at a rate not less than about the rate of receipt of said waste material in said receiving area thereby avoiding substantial agglomeration of said waste material in said receiving area, grinding said waste material delivered to said grinding area to produce a ground pulp having a particle size lying in the range of about 4 to 12 mesh, accumulating said ground pulp in a storage zone, withdrawing ground pulp from said storage zone at a rate dependent on the feed requirements of a subsequent decomposition step and independent of said rate of advance of said waste material, delivering said withdrawn ground pulp in preselected relative quantities to a pair of digestion zones each formed by a plurality of elongated superposed stationary supporting surfaces, advancing said respective quantities of delivered ground pulp successively along said surfaces of said respective zones in a direction parallel to the length thereof, maintaining said ground pulp on said surfaces at a substantially constant depth lying in the range of about 8 to 16 inches, maintaining air spaces above said ground pulp on each of said surfaces, continually agitating said ground pulp while advancing the same over said surfaces to present all portions of said ground pulp repeatedly to the air above said ground pulp whereby substantially complete decomposition of said ground pulp occurs under the action of aerobic bacteria in said ground pulp, passing heated air through the spaces above said ground pulp, the volume, temperature and rate of flow of said air being selected to remove substantially all vapor and gaseous matter evolved from said ground pulp and to assure proper decomposition of said ground pulp, adding nitrogeneous material to the ground pulp in said digestion zones at a point in the advance thereof over said surfaces of said respective zones at which appreciable but not complete decomposition of said ground pulp has occurred, said point in said respective zones corresponding to a later digestive phase relative to the substantially undecomposed condition of said ground pulp as delivered to said zones, withdrawing a portion of the ground pulp from one of said digestion zones at a selected point at which the same is partially decomposed, passing said partially decomposed withdrawn ground pulp to the other of said digestion zones at a selected point corresponding to a preselected state of pulp decomposition, and withdrawing said ground pulp from said digestion zones when said ground pulp is substantially completely decomposed.

8. The method set forth in claim 6, comprising the steps of separating from said withdrawn substantially completely decomposed ground pulp particles thereof which are not substantially completely decomposed, and returning said withdrawn particles to said ground pulp at a point in the advance thereof between said storage zone and the point of substantially complete decomposition.

References Cited in the file of this patent

UNITED STATES PATENTS

| | | |
|---|---|---|
| 2,285,834 | Proctor | June 9, 1942 |
| 2,474,833 | Eweson | July 5, 1949 |
| 2,734,803 | Ruskin | Feb. 14, 1956 |
| 2,820,703 | Dresser et al. | Jan. 21, 1958 |
| 2,864,672 | Brooks | Dec. 16, 1958 |
| 2,929,688 | Riker | Mar. 22, 1960 |
| 2,947,619 | Gorby | Aug. 2, 1960 |
| 3,041,157 | Crane et al. | June 26, 1962 |